US008160970B2

(12) United States Patent
Allsop

(10) Patent No.: US 8,160,970 B2
(45) Date of Patent: Apr. 17, 2012

(54) METHOD FOR USING COLLABORATIVE POINT-OF-VIEW MANAGEMENT WITHIN AN ELECTRONIC FORUM

(75) Inventor: Brent Allsop, Sandy, UT (US)

(73) Assignee: Brent, Inc., Sandy, UT (US)

( * ) Notice: Subject to any disclaimer, the term of this patent is extended or adjusted under 35 U.S.C. 154(b) by 648 days.

(21) Appl. No.: 11/940,431

(22) Filed: Nov. 15, 2007

(65) Prior Publication Data
US 2008/0120376 A1    May 22, 2008

Related U.S. Application Data

(60) Provisional application No. 60/866,381, filed on Nov. 17, 2006, provisional application No. 60/948,798, filed on Jul. 10, 2007.

(51) Int. Cl.
*G06Q 10/00* (2006.01)
(52) U.S. Cl. ........................ 705/319; 705/300
(58) Field of Classification Search ............... 705/1, 300
See application file for complete search history.

(56) References Cited

U.S. PATENT DOCUMENTS

| | | | |
|---|---|---|---|
| 6,347,332 B1 * | 2/2002 | Malet et al. | 709/205 |
| 2003/0028595 A1 | 2/2003 | Vogt et al. | |
| 2003/0182177 A1 * | 9/2003 | Gallagher et al. | 705/10 |
| 2004/0077353 A1 | 4/2004 | Mahany | |
| 2006/0026593 A1 * | 2/2006 | Canning et al. | 718/100 |
| 2006/0101057 A1 | 5/2006 | Farkkila | |
| 2006/0277290 A1 * | 12/2006 | Shank | 709/223 |
| 2007/0233552 A1 * | 10/2007 | Maggio | 705/12 |

OTHER PUBLICATIONS

Class Definition for Class 705 (retrieved from the Internet Archive at http://web.archive.org/web/20050530010449/http://www.uspto.gov/web/patents/classificat.*

* cited by examiner

*Primary Examiner* — Gabrielle McCormick
(74) *Attorney, Agent, or Firm* — Kory D. Christensen; R. Whitney Johnson; Stoel Rives LLP

(57) ABSTRACT

A method for conducting online discussion and collecting point-of-view information on a topic of discussion that includes displaying a hierarchy of topics, each topic corresponding to a position statement representing a consensus point of view of one or more supporters of the topic. At each level of the hierarchy, topics are ordered based on user-selected attributes of the one or more supporters of the topic. A user is allowed to select a topic from the ordered hierarchy to display the corresponding position statement.

26 Claims, 14 Drawing Sheets

METHOD FOR USING COLLABORATIVE POINT-OF-VIEW MANAGEMENT WITHIN AN ELECTRONIC FORUM

RELATED APPLICATIONS

This application claims priority to U.S. Provisional Patent Application No. 60/866,381, entitled "SYSTEM AND METHOD FOR POINT-OF-VIEW MANAGEMENT WITHIN AN ELECTRONIC FORUM" and filed on Nov. 17, 2006, and to U.S. Provisional Patent Application No. 60/948,798, entitled "METHODS AND SYSTEMS FOR USING COLLABORATIVE POV CANONIZATION SYSTEMS" and filed on Jul. 10, 2007. These applications are hereby incorporated herein by reference in their entirety.

TECHNICAL FIELD

This disclosure relates to a method for conducting online discussions over a computer network, and more specifically to collecting point-of-view information on a topic of discussion.

BRIEF DESCRIPTION OF THE DRAWINGS

A more particular description of embodiments of a method for conducting online discussions will be rendered by reference to the appended figures. Understanding that these figures only provide information concerning typical embodiments of the disclosure and are not therefore to be considered limiting of its scope, the embodiments will be described and explained with additional specificity and detail through the use of the accompanying figures, in which.

DETAILED DESCRIPTION OF PREFERRED EMBODIMENTS

Figure 1:
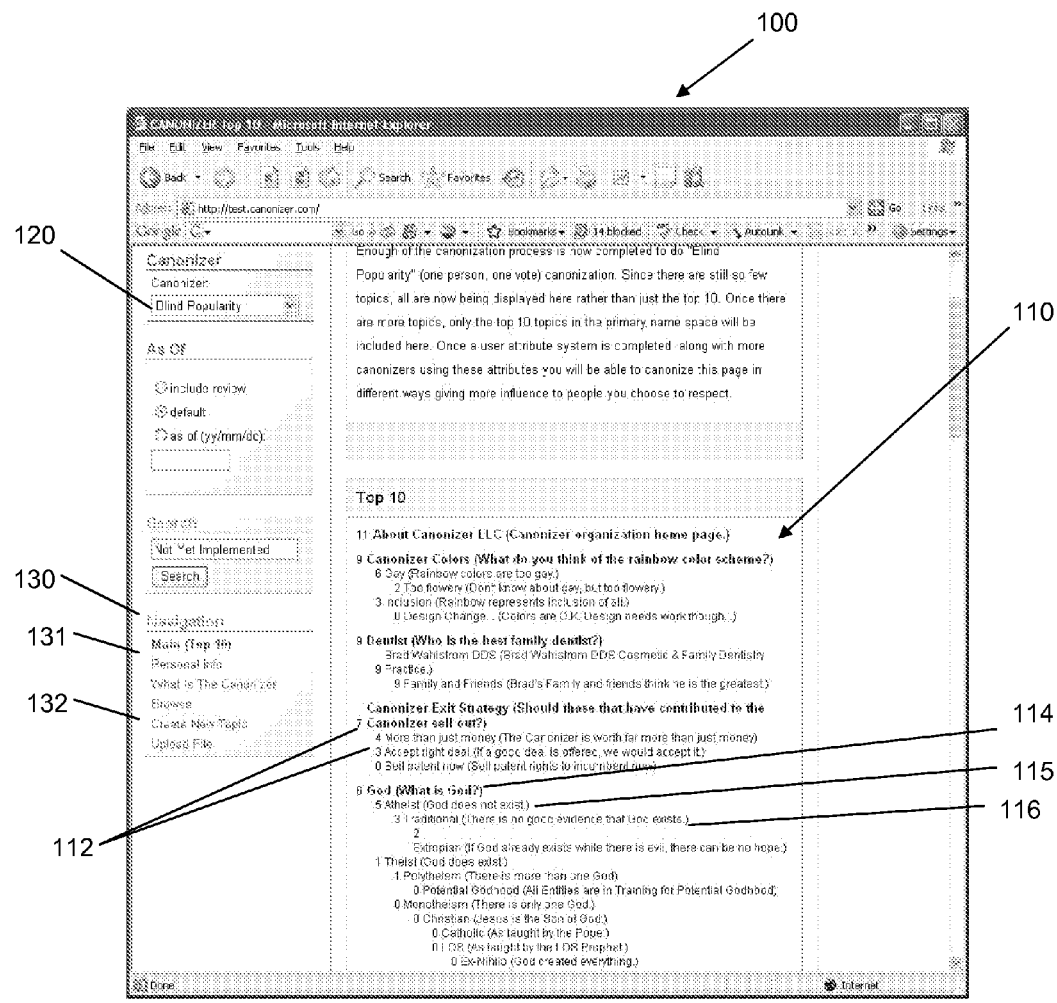
FIG. 1 is an illustration of a web page displaying a hierarchy of topics.

When web pages allow input from many people, in almost all cases the user is typically faced with the daunting task of sorting through hundreds or even thousands of discussion entries to find desired information and get an idea of how much support there is for a particular point of view on the topic of the discussion. Unfortunately, current systems do little more than organize the discussion topics chronologically, and in best cases according to simple popularity with no grouping. Rather than viewing the most recent discussion topics, however, a user may prefer to see what the views are of other users who share similar interests. For example, a user may want to view only topics of interest to other users who claim a belief in a particular religion. In one embodiment, adherents to a particular religion may have previously considered the different topics and indicated their support for one or more topics. As described in greater detail below, by registering their support, the users become supporters of the topic and any corresponding position statement about the topic. Support for a topic may indicate an interest for the topic and content of the corresponding position statement.

Other examples might include a user wanting to view only topics supported by supporters having a certain ethnic or cultural background, or a particular gender, or a certain level of education. The list of potential attributes of supporters may be infinite. Moreover, attributes may be combined to create a narrower selection of supporters. The combination may be created using a variety of methods, including but not limited to the use of simple Boolean logic. For example, a user may want to view topics supported by supporters who are "female" AND "Christian." Alternatively, a user may want to view topics supported by supporters who are of "Asian" OR "Indian" descent. In another situation, a user may want to view topics supported by individuals who are "Christian" AND NOT "Catholic." The combinations of attributes a user may request likewise may be infinite.

In one embodiment, once the attributes of the supporters are selected, a hierarchy of discussion topics may be ordered according to the level of support for each topic from supporters having the selected attributes. The effectiveness of searching for topics supported by users with any given set of attributes may be limited only by whether the users and/or the system implementing the method recognize and associate the particular attributes in the set.

In another embodiment, a user may order a hierarchy of discussion topics based on a value determination algorithm that considers a set of user selected attributes and combines them and weighs them according to the user's specification. A value determination algorithm may be defined using a scripting language. The user may submit the specification to a central administrator to commit the specification to a script. In another embodiment, the user may specify the value determination algorithm directly using a scripting language. A value determination algorithm may be named and stored for later selection by other users, similar to a set of attributes being named and stored for later selection.

In still another embodiment, a user may order a hierarchy of discussion topics based on other criteria, besides the personal attributes of supporters. For example, a user may be enabled to define a value determination algorithm that orders the hierarchy based on querying an external search algorithm, such as Google, to determine the number of times a discussion topic is referenced elsewhere.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Several aspects of the embodiments described may be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Displaying a Hierarchy of Topics

FIG. 1 is an illustration of a web page 100 displaying a hierarchy of topics 110 according to one embodiment. As shown, the hierarchy of topics 110 may be an inverted tree structure having topics at a top level and possibly having one or more other topics, in the form of subtopics, at one or more levels below each top-level topic. For example, in the display of the embodiment of FIG. 1 a topic "God (What is God?)" 114 is a topic at the top level of the hierarchy. Another topic "Atheist (God does not exist)" 115 is a subtopic of the topic "God (What is God?)" 114. Still another topic, "Traditional (There is no good evidence that god exists)" 116 is a subtopic of topic "Atheist (God does not exist)" 115.

At each level of the hierarchy 110, the topics may be ordered according to a value determination algorithm considering user-specified attributes of supporters of each topic. Thus, all topics at any given level in the hierarchy 110 may be ordered with respect to one another according to the number of supporters of each topic having the attributes specified by the user. Any subtopics under a topic in the hierarchy 110 may be ordered in a similar manner with respect to one another under the topic. While in one embodiment the topics may be searched in a customary manner using a search algorithm and key words or phrases, ordering the topics according to attributes of supporters is an alternative way to sort, filter, rank, organize, and otherwise facilitate a user in digesting the content of a discussion.

In another embodiment, the hierarchy of topics may be ordered according to a user-defined value determination algorithm considering other factors, qualities, or attributes that can be tracked. By way of example and not limitation, the value determination algorithm may query a search engine, or gather data from an external website or database, or depend on time of day, day of week.

Still referring to FIG. 1, the hierarchy 110 may be initially ordered according to a first and default value determination algorithm considering a first and default set of attributes of supporters. The default algorithm may always be the same or may be user configurable. In other embodiments, the hierarchy 110 may be ordered prior to being displayed by allowing the user to first select an algorithm and corresponding set of attributes. Ordering the hierarchy 110 according to user-selected criteria is discussed below in conjunction with FIGS. 2 through 4B.

In one embodiment, all levels of the hierarchy may be ordered according to the same value determination algorithm. In another embodiment, the topics at the top level of the hierarchy, or "top-level" topics, may be ordered differently from topics lower in the hierarchy. For example, all of the hierarchy except for the top-level topics may be ordered according to one value determination algorithm considering a set of attributes of supporters, while the top-level topics may be ordered according to criteria other than supporter attributes. For example, the top level may be ordered according to popularity, listing the top 10 most popular top-level topics. Other examples may include, but are not limited to, ordering the top-level topics by most recently created, most recently modified, quantity of recent activity among subtopics, or chronologically. The ordering of the top-level topics may be customizable, such that a user can immediately view top-level topics of greatest interest. In still another embodiment, additional levels of the hierarchy may be ordered according to different criteria than lower levels in the hierarchy.

As shown in the web page of the embodiment of FIG. 1, a value determination algorithm may be represented by a label, such as "Blind Popularity" 120. A label may allow for quick and efficient selection of, and reference to, a value determination algorithm. A particular value determination algorithm may gain popularity among users, and a readily identifiable label allows users to easily select the algorithm, share it with other users, and quickly and easily change among different algorithms. Creating and labeling a value determination algorithm and a set of supporter attributes to be considered by the algorithm will be discussed below in conjunction with FIGS. 10A and 10B.

FIG. 1 further illustrates that displaying the hierarchy of topics 110 may involve displaying a support indicator 112 for each topic. The support indicator 112 may represent the level of support for the topic, the level of support being proportional to the number of supporters having the attributes selected by the user. As shown in the web page of the embodiment of FIG. 1, the support indicator 112 may be a numerical value. However, the indicator may also be a percentage, a gauge, a graph, a defined color, or any other indicator showing a level or quantity of support. Other types of information about the topic or statement may be included. A value determination algorithm may determine the level of support for the topic.

In FIG. 1, the display of the embodiment may also include a Navigation section 130, which includes a link Personal Info 131 to take a user to a page where the user can register or login as a registered user and enter or edit personal information, including but not limited to attributes about the user that would be considered in ordering the hierarchy 110 if the user supports a topic. The Navigation section 130 also may include a link Create a New Topic 132 to enable a user to create a new topic.

Ordering the Hierarchy of Topics

Figure 2:
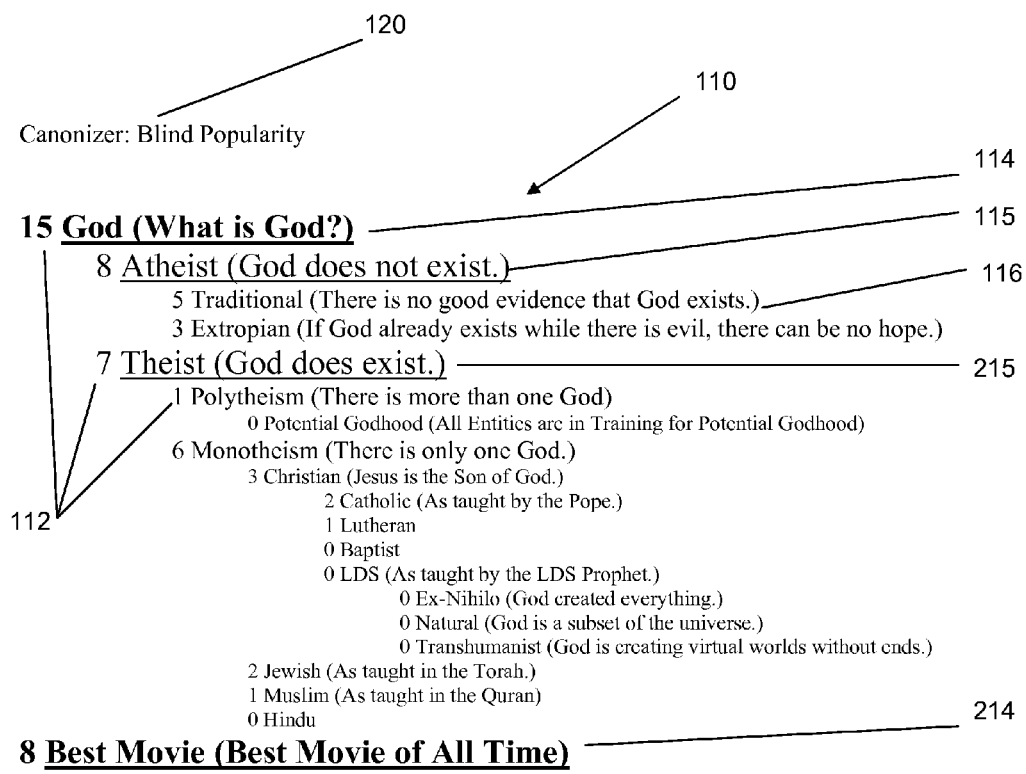
FIG. 2 depicts a hierarchy of topics ordered according to a level of support for each topic determined by a first and default value determination algorithm based on a first set of attributes of supporters.

FIG. 2 illustrates one embodiment of the present disclosure ordering a hierarchy of topics 110 according to the value determination algorithm labeled Blind Popularity 120 from FIG. 1. In this embodiment, Blind Popularity 120 may order the topics according to number of supporters supporting each topic. Blind Popularity 120 may equate one supporter with one unit of support, essentially ignoring all the attributes of the supporters except for the fact that they are supporters.

Other value determination algorithms may consider other supporter attributes. Enabling users to order the hierarchy of topics according to supporter attributes allows the user to find topics that are of interest to other users having a set of one or more desired attributes. Ordering in this manner may facilitate ranking, filtering, prioritizing, and organizing the content of the discussion, and otherwise empower a user to focus on topics that are of interest to the user based on other supporters having a set of one or more desired attributes.

With continued reference to the embodiment of FIG. 2, the support indicator 112 for each topic may be a numerical value. With Blind Popularity 120 selected, the support indicator 112 may display the number of supporters of the topic. For example, in FIG. 2 the topic "God (What is God?)" 114 is shown having fifteen supporters. Similarly, the hierarchy 110 displayed may be ordered according to the number of supporters of the topic. The two top-level topics appearing in the hierarchy 110, namely the topic "God (What is God?)" 114 and the topic "Best Movie (Best Movie of All Time)" 214 have fifteen and eight supporters, respectively. Thus "God (What is God?)" 114 is ordered before "Best Movie (Best Movie of All Time) 214."

The topics "Atheist (God does not exist)" 115 and the topic "Theist (God does exist)" 215 are subtopics under "God (What is God?)" 114 in the hierarchy 110, having eight supporters and seven supporters, respectively. The topics "Atheist (God does not exist)" 115 and the topic "Theist (God does exist)" 215 may be considered as siblings in the hierarchy as they are at the same level under the same topic in the hierarchy. As illustrated in FIG. 2, siblings may be similarly ordered in the hierarchy 110 from most supporters to least supporters.

Beneath both the topic "Atheist (God does not exist)" 115 and the topic "Theist (God does exist)" 215 are additional topics appearing as subtopics in a lower level of the hierarchy 110. At each lower level of the hierarchy, sibling topics are similarly ordered with respect to each other from most level of support to least level of support as determined by the currently selected value determination algorithm and indicated as being subtopics of a higher level topic. Sibling topics may be competitors competing for supporters, while sub topics may be supporting topics because support for a subtopic may implicitly be support for all higher-level topics.

FIG. 2 also illustrates that in one embodiment of the disclosed method a user supporting a subtopic may, by implication, also be considered a supporter of all higher level topics. The support for a subtopic may be included in the support for the higher level topic. Thus, topics higher in the hierarchy may carry the support both of the topic directly and of all supporters of any subtopics beneath the topic in the hierarchy. Further, FIG. 2 illustrates a possible scenario where the number of supporters for all subtopics equals the number of supporters for the higher level topic. As illustrated, the support indicators 112 may be numbers and, at each level of the ordered hierarchy 110, the number of supporters for each topic may equal the sum of the number of supporters for all subtopics at the next level below the topic. Thus, the number of supporters for the topic "Atheist (God does not exist)" 115, namely eight, and the number of supporters for the topic "Theist (God does exist)" 215, namely seven, sum together to equal the number of supporters for the higher level topic "God (What is God?)" 114, namely fifteen supporters. There are no supporters that only support the topic "God (What is God?)" 114 alone. In another embodiment, the support indicator for a topic may be a number higher than the sum of all subtopics a level down where supporters may be supporting only the higher level topic.

Figure 3:
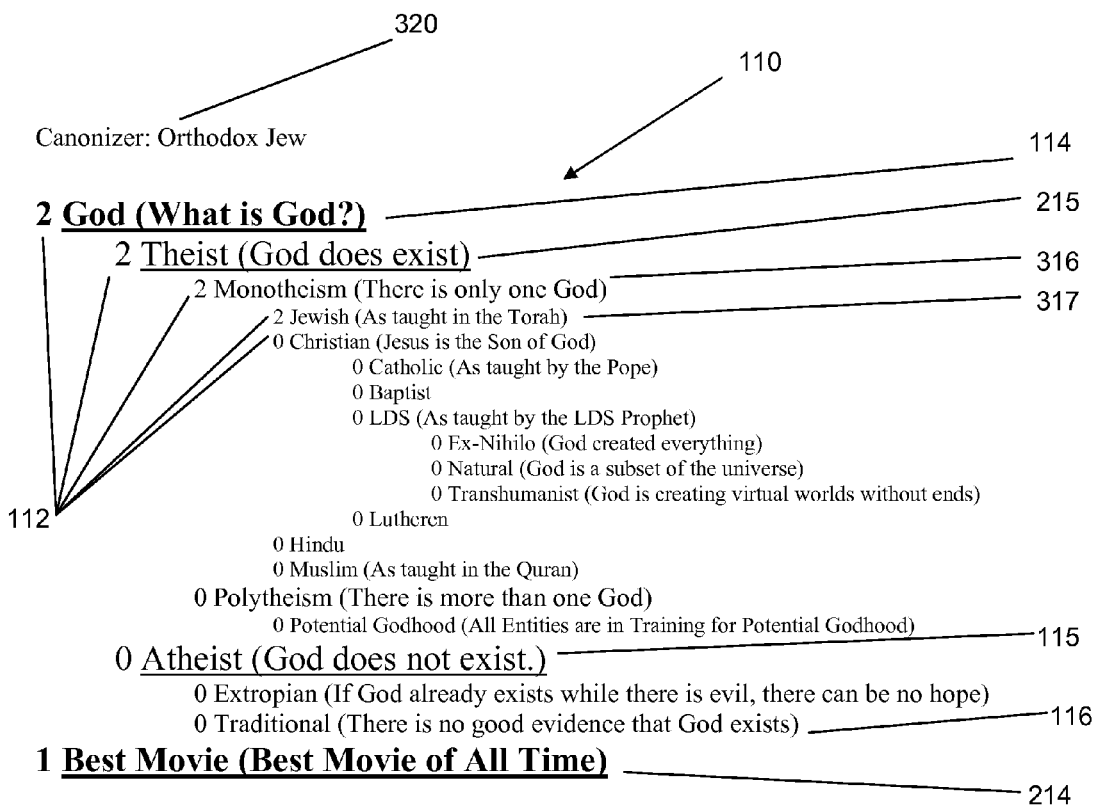
FIG. 3 depicts a hierarchy of topics ordered according to a level of support determined by a second value determination algorithm based on a second set of attributes of supporters.

FIG. 3 illustrates an embodiment of the present disclosure ordering a hierarchy of topics 110 according to a second value determination algorithm labeled "Orthodox Jew" 320, which considers a second set of supporter attributes. The specific attributes, the number of attributes, and the combination of attributes is unimportant except to disclose that any number of any type of attributes in any combination is possible. By way of illustration, the set of attributes for Orthodox Jew may include without limitation one or more of the following: believe in the divine origin of the Torah (i.e. the Pentateuch); believe that there is also an oral law in Judaism; believe that God has made an exclusive, unbreakable covenant with the Children of Israel to be governed by the Torah; adhere to Halakha (the Shulkhan Arukh known as the "Code of Jewish law").

When a user selects Orthodox Jew 320, the embodiment may consider whether any of the supporters of each of the topics have these attributes. Depending on how the user defined the algorithm or specified that the attributes should be combined, the embodiment may look for supporters having all the attributes, any of the attributes, or any combination of the attributes in the set (specifying attributes is discussed below in connection with FIGS. 10A and 10B below). If a supporter has the attributes in the set, or the right combination of attributes in the set, that supporter's support is included in determining the support value.

In FIG. 3, the hierarchy of topics 110 is the same list of topics in FIG. 2 ordered according to the number of supporters of each topic having the attributes in the set Orthodox Jew 320. Not unexpectedly, two supporters of the subtopic "Jewish (As taught in the Torah)" 317 may have the attributes specified in the value determination algorithm Orthodox Jew 320, and the support of these supporters is considered in the ordering. In the present embodiment, by implication these two supporters also support the topic "Monotheism (There is only one God)" 316, the topic "Theist (God does exist)" 215, and the topic "God (What is God?)" 114. One of the supporters having the attributes of Orthodox Jew 320 also supports the topic "Best Movie (Best Movie of All Time)" 214. The supporters of all the other topics do not have the attributes of the set Orthodox Jew 320, and thus, their support is not registered. The result is a reordering of the hierarchy 110 and change in the support indicators 112, allowing the user to quickly and easily see the topics that are most supported by supporters having the attributes in the set Orthodox Jew 320.

Figure 4A:
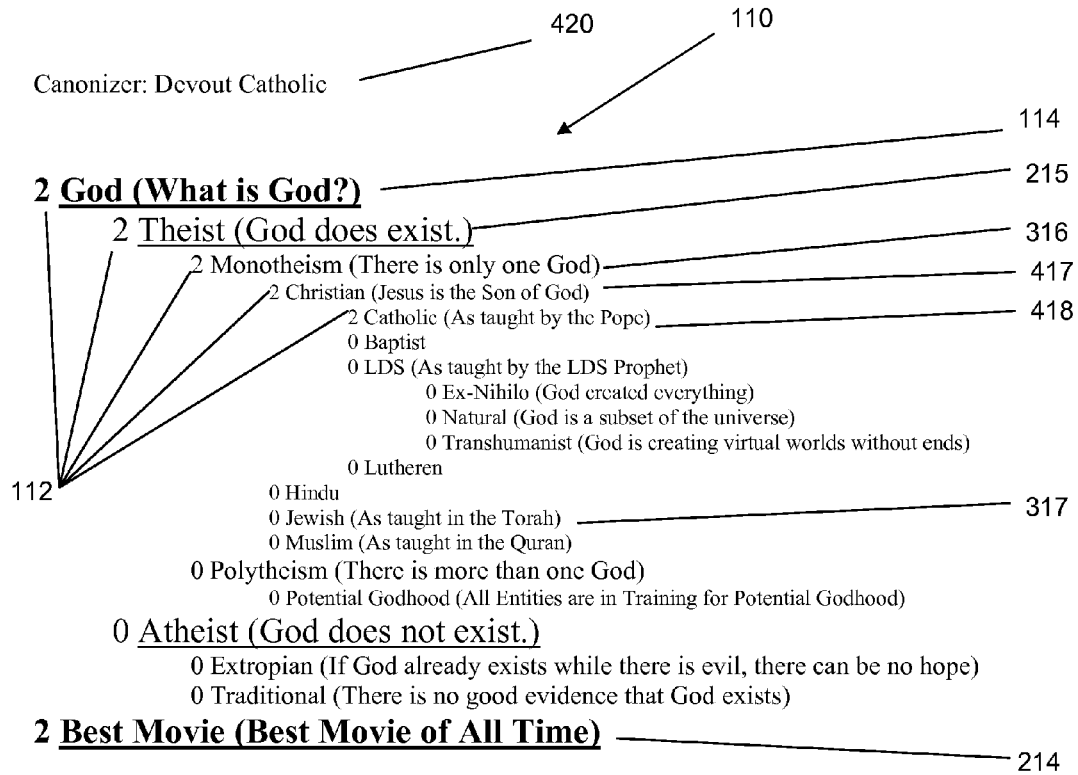
FIG. 4A depicts a hierarchy of topics ordered according to a level of support determined by a third value determination algorithm based on a third set of attributes of supporters.
Figure 4B:
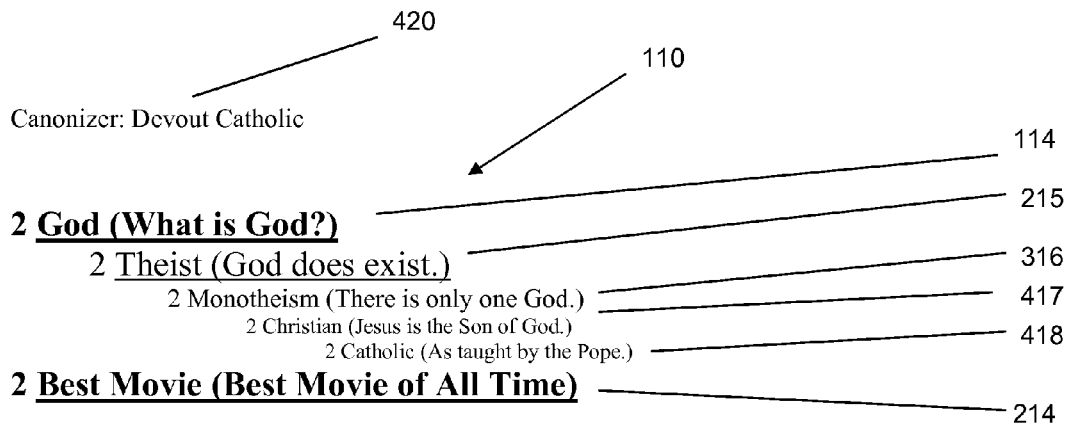
FIG. 4B depicts a hierarchy of topics ordered according to a level of support determined by a fourth value determination algorithm based on a fourth set of attributes of supporters.

FIGS. 4A and 4B illustrate an embodiment of the present disclosure ordering 112a hierarchy of topics 110 according to a third value determination algorithm labeled "Devout Catholic" 420, which considers a third set of supporter attributes. Whatever the attributes included in this set, not unexpectedly, the supporters of the topic "Catholic (As taught by the Pope)" 418 appear to have these attributes as their support is registered for that topic and, by implication, all topics higher in the hierarchy 110. Both of the supporters having the attributes of Devout Catholic 420 also were among the original eight supporters of the topic "Best Movie (Best Movie of All Time)" 214, and their support for the topic is indicated by the support indicators 112 accordingly. FIG. 4A shows that the support of all other supporters did not register for any topics, indicating these supporters did not have the attributes of the algorithm Devout Catholic 420.

FIG. 4B depicts an embodiment of the present disclosure ordering the hierarchy of topics 110 and also filtering out topics without a threshold level of support from supporters having the attributes of the user-selected set (in this case Devout Catholic 420). In the present embodiment, the threshold level is anything above 'zero' support (or no support). Thus, all the topics having no support as determined by the currently selected value determination algorithm are omitted from the displayed reordering of the topics. The topic "Jewish (As taught in the Torah)" 317 from FIGS. 3 and 4A is among the topics omitted because it had no support from supporters having the attributes of Devout Catholic 420.

Displaying a Position Statement of a Topic

Figure 5A:
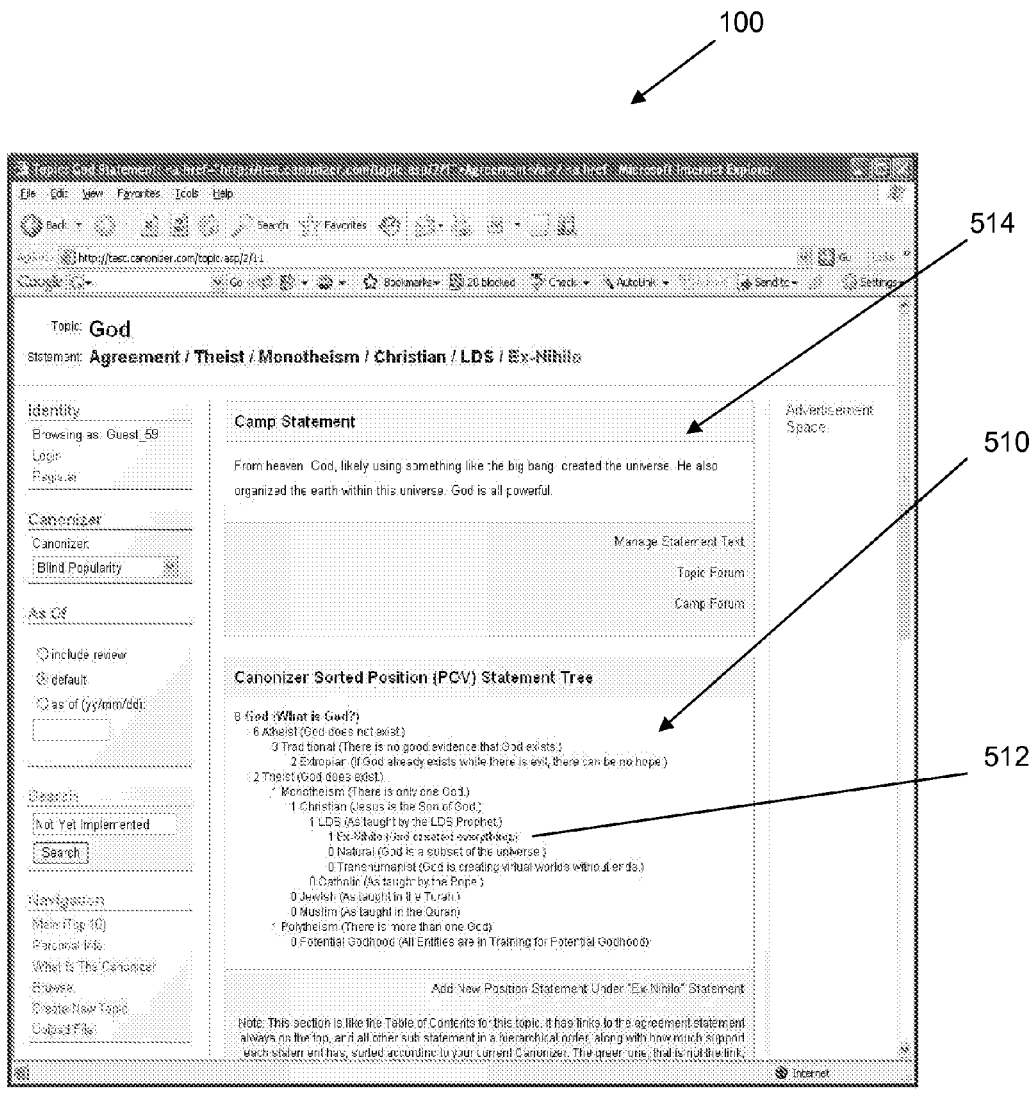
FIG. 5A is an illustration of a web page displaying a position statement corresponding to a topic selected by a user.

FIG. 5A shows a web browser 100 displaying a position statement 514 corresponding to a topic selected by the user, according to one embodiment. In the present embodiment, a user may click on a topic in the hierarchy 110 (as first shown in FIG. 1) and then be directed to another web page displaying the topic 512 and the position statement 514 corresponding to the topic. A position statement 514 may comprise statements representing a consensus point of view of one or more supporters of the topic and the statement. If there is no consensus point of view, the position statement 514 may be empty. In one embodiment, the position statement 514 may be of any length and in any format. In other embodiments, there may be a limit imposed on the length or formatting requirements. While a position statement 514 may typically comprise text, some embodiments may allow the statement to include images, sounds, video, or any other means of conveying information. In one embodiment, a position statement 514 of some length may be required. In another embodiment, if there is no consensus point of view about the topic, the statement may be empty or contain default text.

Still referring to FIG. 5A, displayed on the same web page as the position statement may be a portion 510 of the ordered hierarchy of topics 110 (depicted in FIG. 1) containing the topic 512 corresponding to the displayed position statement. Displaying the portion 510 of the hierarchy may improve convenience in navigating to the position statement of another topic. In another embodiment, the entire hierarchy of topics 110 may be displayed.

Figure 5B:
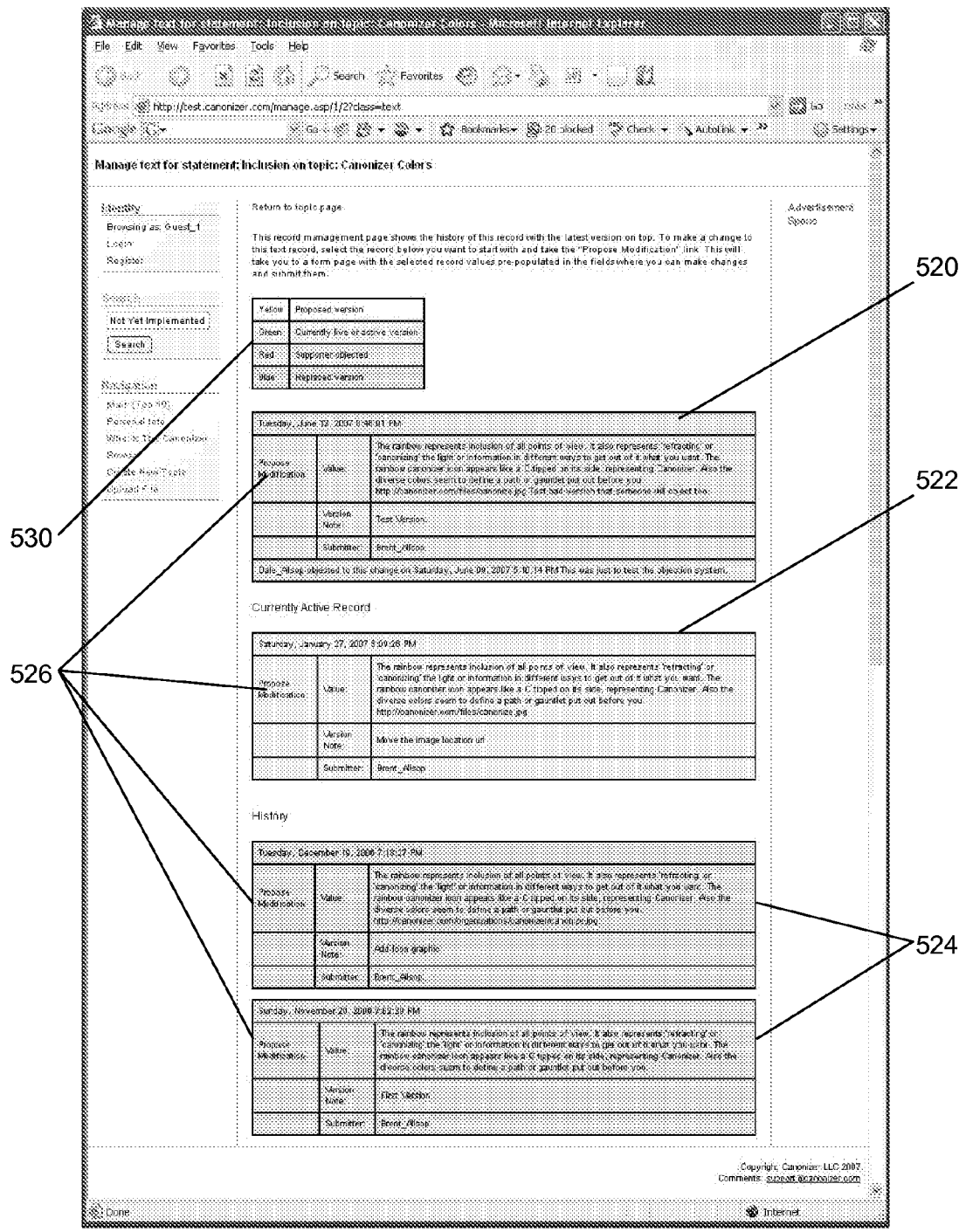
FIG. 5B is an illustration of a web page used to coordinate creation of and track changes to a position statement.

FIG. 5B is an illustration of a web page enabling management of a position statement by coordinating creation of, and changes to, a position statement according to one embodiment. In one embodiment, a user may be able to view the history of a statement. Previous versions of any modified statement may be stored and accessed such that users could track the development and evolution of a currently 'live' version of a position statement. The history may include a currently active record 522 for indicating the currently active or live version of the position statement. The history may also include one or more history records 524 indicating past versions of the statement that were once active. The history may also include an objected-to record 520 for indicating a proposed modification to the statement that was objected to by one or more supporters. An objected-to record may be anywhere in the history. Each type of record may be considered a managed record and be labeled and/or shaded by color according to type. A legend 530 may provide indication of which type of records are indicated by which color. Moreover, each type of record may include a link 526 for enabling a user to propose a new version by making a modification to an existing record. The history may include a proposed record (not shown) for indicating a proposed version of a statement. A proposed record may represent a record that, if no supporters object to it, is about to go live after a pre-determined amount of time. In one embodiment, a user may be enabled to easily compare proposed versions with previous versions. Tools for displaying differences between versions and/or highlighting changes may be utilized.

In one embodiment, a "camp" may be understood to comprise a statement and all sub-statements. The supporters of the statement and sub-statements may be considered to be members of the same camp because they all support the same views on a topic.

In another embodiment, users may be enabled, preliminary to the review process, to make preliminary proposals. For example, a user may propose splitting a camp if a minority person is preventing a change that the majority of supporters want. The preliminary version may be shown for review. Supporters also may be able to indicate that they are in the majority and want the change. They also may be able to indicate that they will switch to a new camp with the proposed change being objected to by the minority if a split occurs. In this way, a majority can communicate with a minority supporter who is blocking a change that a split camp would leave him all alone, thus applying pressure for the minority supporter to be more willing to negotiate and allow the change.

In still another embodiment, the page may display a score and rank indicator showing where the new proposed version would be ranked, given the level of preliminary support, according to the user's selected set of attributes of supporters. The level of preliminary support gives an idea of the loss of legitimacy that would occur if the camp is split.

In still another embodiment, negotiation may occur in the camp forums (camp forums are discussed in conjunction with FIG. 6 below). A user may threaten, in a camp forum, to split the camp if some other supporter does not allow a particular change. Moreover, all the supporters may be able to submit a post on the camp forum indicating that they will switch to the new camp.

Figure 6:
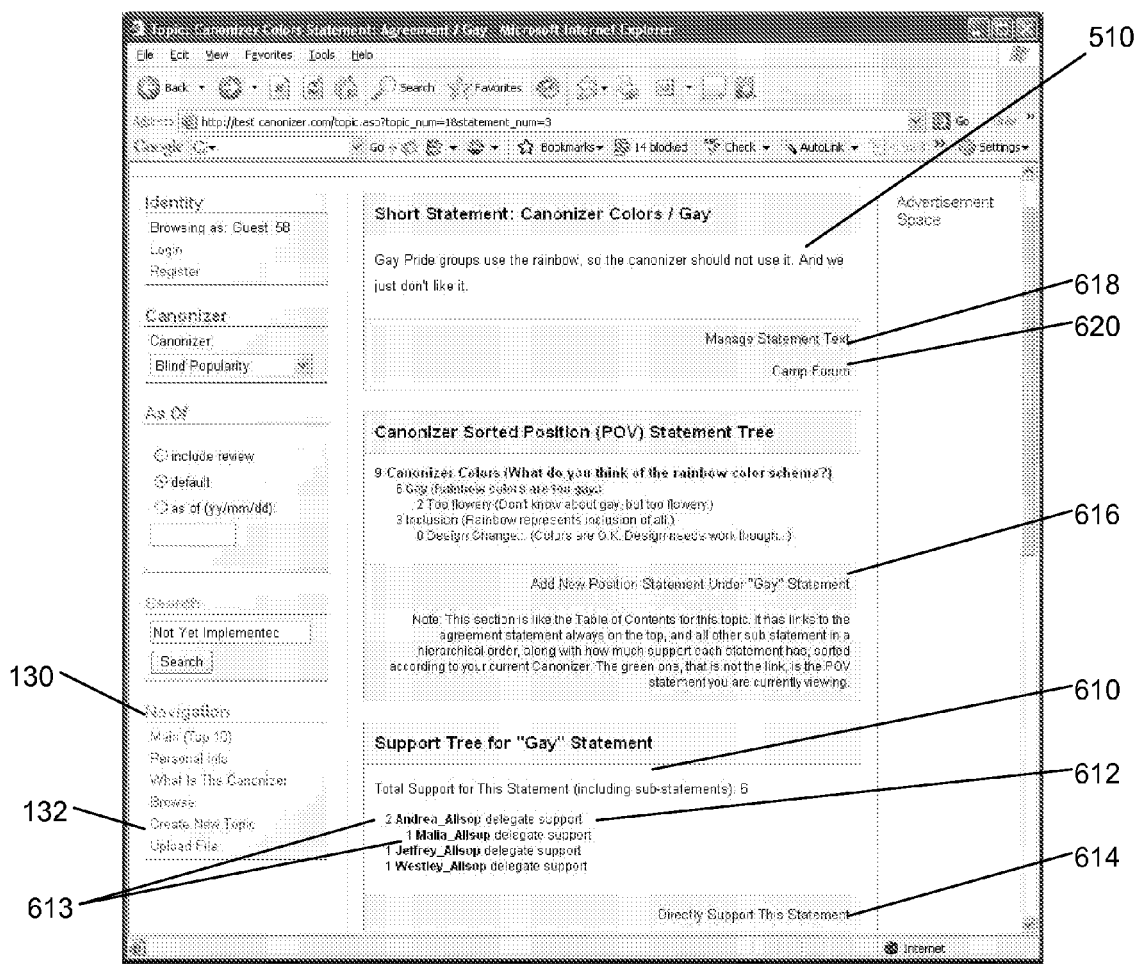
FIG. 6 is an illustration of a web page enabling a user to add support to a topic, whether by indicating direct support or delegating support to another supporter.

FIG. 6 also illustrates a web page displaying a position statement 510 and also indicating the level of support for the position statement according to the current user-selected attributes. In the present embodiment, the level of support is indicated in a tree structure referred to as a support tree 610. The support tree of this embodiment shows the supporters in a hierarchy indicating direct supporters at the top level, and delegate supporters lower in the hierarchy. The support tree may display the names of supporters, nicknames for the supporters, a user id for the supporters, or some other form of identifier. The supporters displayed may be considered to be in the same camp. Essentially all the supporters in a support tree may considered to be in the same "camp," because they share the same views on the topic.

With continuing reference to FIG. 6, displayed with the position statement may also be a link Manage Statement Text 618 to enable the user to contribute to the content of the position statement. Clicking this link may enable the user to edit the content of the position statement. In one embodiment, the link may re-direct a user, denying the user from contributing to the position statement without first registering as a direct supporter of the topic and position statement. A direct supporter of the topic and position statement may be directed to a web page similar to the page shown in FIG. 5B for managing a position statement. In another embodiment, any user may contribute to the position statement, and the link may enable the user to make such contribution. A user may be directed to a web page similar to the page shown in FIG. 5B.

The embodiment shown in FIG. 6 also may display with the position statement a link Camp Forum 620 to link a user to an online "camp" forum about the position statement. Each camp may include a forum for discussion about how to improve the point-of-view of position statements of the camp. In the forum, users can ask questions about the statement and propose new versions of the statement for other users to review. In one embodiment, any registered user can post to any forum, not just to forums for statements of which they are supporters. In another embodiment, only supporters of the topic and position statement may participate. Supporters of a camp may receive an email version of all postings to the corresponding forum. Included in the email may be a message saying that, if they do not want to receive such email in the future, they can change their support from direct to delegated (see section below for discussion of direct and delegated support).

Discussion may also occur in the forums regarding the topic and the discussion may be recorded as history. The debate and discussion occur in the forums, and the final result and goal of each discussion is a concise and quantitative representation of all points of view. In this way, the system has history in the form of position statements, so that the next time the debate happens, progress can be made, rather than just restating the same arguments repeatedly. Moreover, new users to the discussion can quickly assimilate the content of the discussion without being expected to read the entire archive of the forum. Thus, new users with new information have increased ability to get the new information added and move the position statement forward without mundane, unnecessary repetition.

Enabling a User to Support a Topic

FIG. 6 also illustrates a web page enabling a user to support a topic according to one embodiment. The web page may display a link Directly Support this Statement 614 by which a user can register direct support for a topic. In one embodiment, direct supporters may be required to agree to participate in providing the content of the position statement. Direct supporters may receive an email version of all posts to all supported statement forums. Direct supporters are encouraged to pay attention to the emails and help with reviewing and improving the data. With respect to top level position statements, direct supporters are encouraged to remove controversial information that anyone does not agree with. All such point-of-view information should be moved to lower level camp statements. Also, when a change is submitted, all direct supporters may receive an email notification of such changes being proposed. In one embodiment, proposed changes may first be placed in a review status for a predefined period; for example, one week. If any supporters object to the proposed changes, the change becomes "objected to" and will never go live. If no one objects during the time period, the unanimous agreement of all supporters is assumed, and the change goes live. Once a change goes live, it can no longer be objected to.

In another embodiment, only direct supporters participating in providing the content of the position statement may be enabled to approve or comment on additions, deletions, and edits to the position statement as well as entirely new drafts of the position statement. A direct supporter may be enabled to download an editable version of the position statement. A direct supporter may be added to an email list and receive emails containing questions about the topic, suggested changes to the position statement, or proposed new drafts of the position statement. In one embodiment, the method may require that the user respond within a time period or else be deemed to have acquiesced to the changes.

In another embodiment, a link Delegate Support 612 may be presented by which a supporter can delegate the responsibility of participating in providing the content of the position statement to another supporter. A supporter may delegate support to either a direct supporter, or to another supporter that has delegated his or her support. The delegatee may then control any delegated support by either directly supporting a topic or by further delegating support to another delegatee. The delegated support follows the support of the delegatee. In another embodiment, the delegated support may follow the delegatee, even if the delegatee switches support to another topic and thereby switches camps.

In one embodiment, when a user supports a subtopic, that support may be implicitly included for every topic above the topic in the hierarchy. Thus, a supporter of a topic that is a subtopic representing an obscure point of view would also be counted as supporting the top-level topic. The sum of all support for all subtopics of a topic would never exceed the support for the topic itself.

In another embodiment, a user may be able to support subtopics without supporting the parent statement, or be related in any way with any other support of any other statement. This form of narrow support may be separate from direct and delegated support such that it plays no part in the ordering of the hierarchy of topics.

In yet another embodiment, a user may be limited to supporting only a single topic and position statement under a main branch of the hierarchy, a main branch of the hierarchy being a topic at the top level of the hierarchy and all subtopics underneath. Limiting support to a single topic under a branch of the hierarchy would prevent a supporter from registering support for inconsistent points of view on a topic. Also, where support for subtopics is attributed to all topics above the subtopic, limiting supporters to supporting a single topic would also prevent a supporter from providing more than one unit of support by simply supporting subtopics at different levels in the same branch of the hierarchy and having the support for each subtopic attributed upward.

In another embodiment, a user may be able to support multiple subtopics under a single topic, as long as they are not a parent or child of each other. The amount of multiple support that is considered in ordering the hierarchy of topics may depend on the scoring defined in the set of attributes of supporters selected by the user or the value determination algorithm.

In still another embodiment, a supporter may be limited to extending only a single unit of support per branch. Thus, an embodiment may allow a supporter to support more than one subtopic, but the sum total of support for each subtopic may only equal a single unit of support. For example, the supporter may support two topics, "Pirates of the Caribbean" and "Return of the Jedi", under the top level topic "Best Movie (What is the Best Movie of All Time)." However, only 0.5 unit of support could go to each of the two topics, or some fractional combination summing to one unit of support. Limiting support to a support unit under a branch of the hierarchy would discourage supporting more than a single topic and limit the number of supporters support for inconsistent points of view on a topic.

In still another embodiment, user may be allowed to support, in an ordered fashion, more than one topic in a single branch of the hierarchy and allow the user-selected value determination algorithm to determine which of the support choices should be considered. For example, one value determination algorithm may specify that only the first support choice should be considered. Another value determination algorithm may assign a diminishing level of weight to each support choice. Yet another value determination algorithm may divide the weight of each support choice evenly.

Belief Statements

Figure 7:
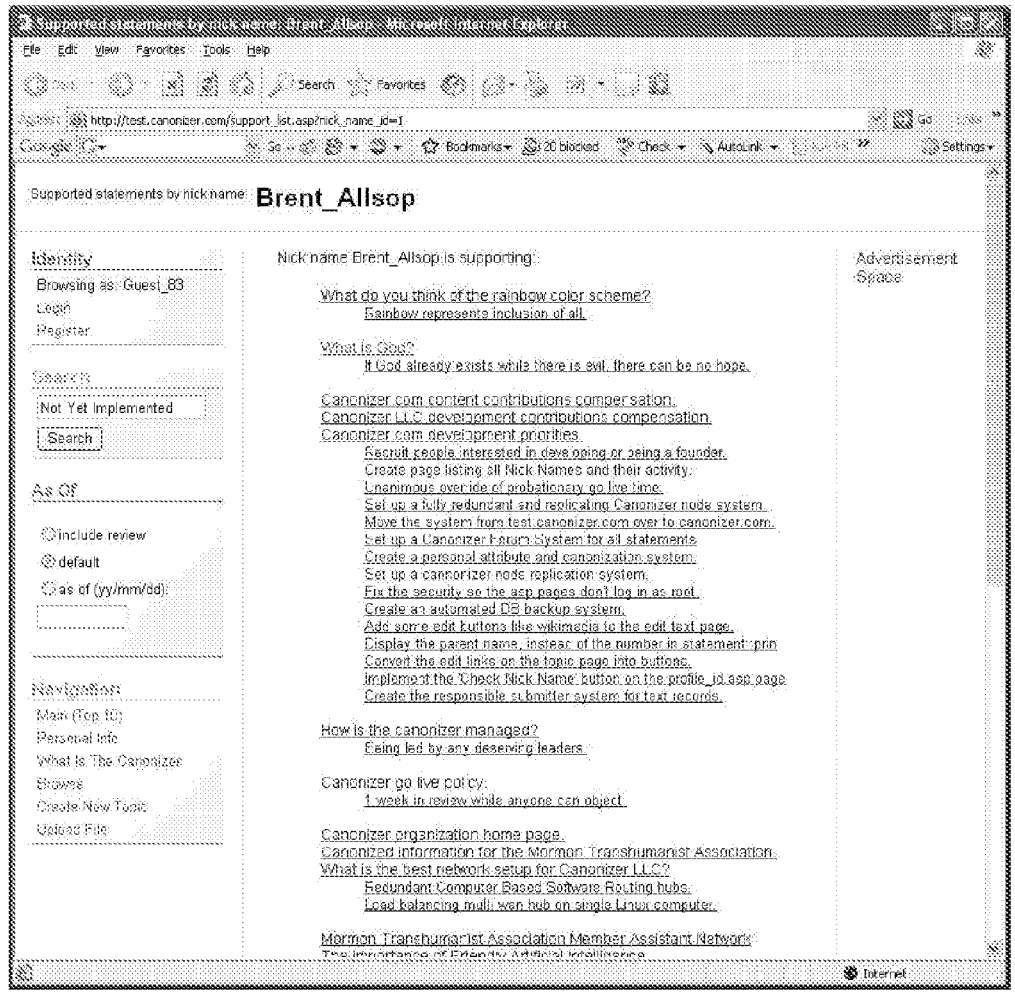
FIG. 7 is an illustration of a web page displaying a personal belief statement.

Enabling users to register support for one or more topics and corresponding position statements may allow for quick and efficient gathering of all of the supported topics and position statements into a single compilation or belief statement. FIG. 7 depicts a belief statement according to one embodiment. A belief statement which compiles all supported topics and position statements allows others to quickly determine the views, opinions, and beliefs of the supporter. Moreover, the supporter can quickly view the topics he or she is supporting, which may be useful for, among other things, sharing with others or analyzing for inconsistencies.

In one embodiment, when a user contributes to and supports topics, attribution of the contribution and support may take place via nicknames. The belief statement may comprise all contribution and statements supported by a nickname, all linked to a page showing the contributions and statements supported by associated nickname.

In one embodiment, other users may be enabled to compile the topics and position statements another user supports. Users may also be able to combine together into groups and create a group compilation of the topics and position statements supported. In another embodiment, a user may compile only the topics and position statements he or she supports. A logged-in user may be enabled to see everything he or she is supporting with all associated nicknames.

In one embodiment, a user may be enabled to compile, into a single belief statement, all of the position statements the user supports. The single statement may include the position statements of only the topics the user directly supports. In another embodiment, the position statement may include the position statements of all topics supported, both with direct support and delegated support. In another embodiment, the compilation may include the position statements of all subtopics the user supports preceded by the position statements of all topics above the subtopic in the hierarchy of topics 110.

In another embodiment, the position statement corresponding to each topic may further comprise a short summary of the information contained in the position statement. In this embodiment, the belief statement may compile all of the short summaries of the position statements the user supports.

In yet another embodiment, a user may be enabled to send to others a URL to an online dynamic belief statement compiling the supported topics and corresponding position statements.

In yet another embodiment, a user may be enabled to compare the belief statements. Comparing belief statements may be useful in certain situations, including but not limited to dating services or selecting political candidates. A person could determine who to vote for based on how closely the candidate's support matches his or her own support. Web sites for political candidates could provide interfaces for determining how close the candidate's beliefs, views, and desires are to the voter's beliefs, views, and desires relative to competing candidates. Dating services may benefit from interfaces to facilitate providing belief similarity (or difference) scores of people searching for potential dates.

Creating a New a Topic

Figure 8:
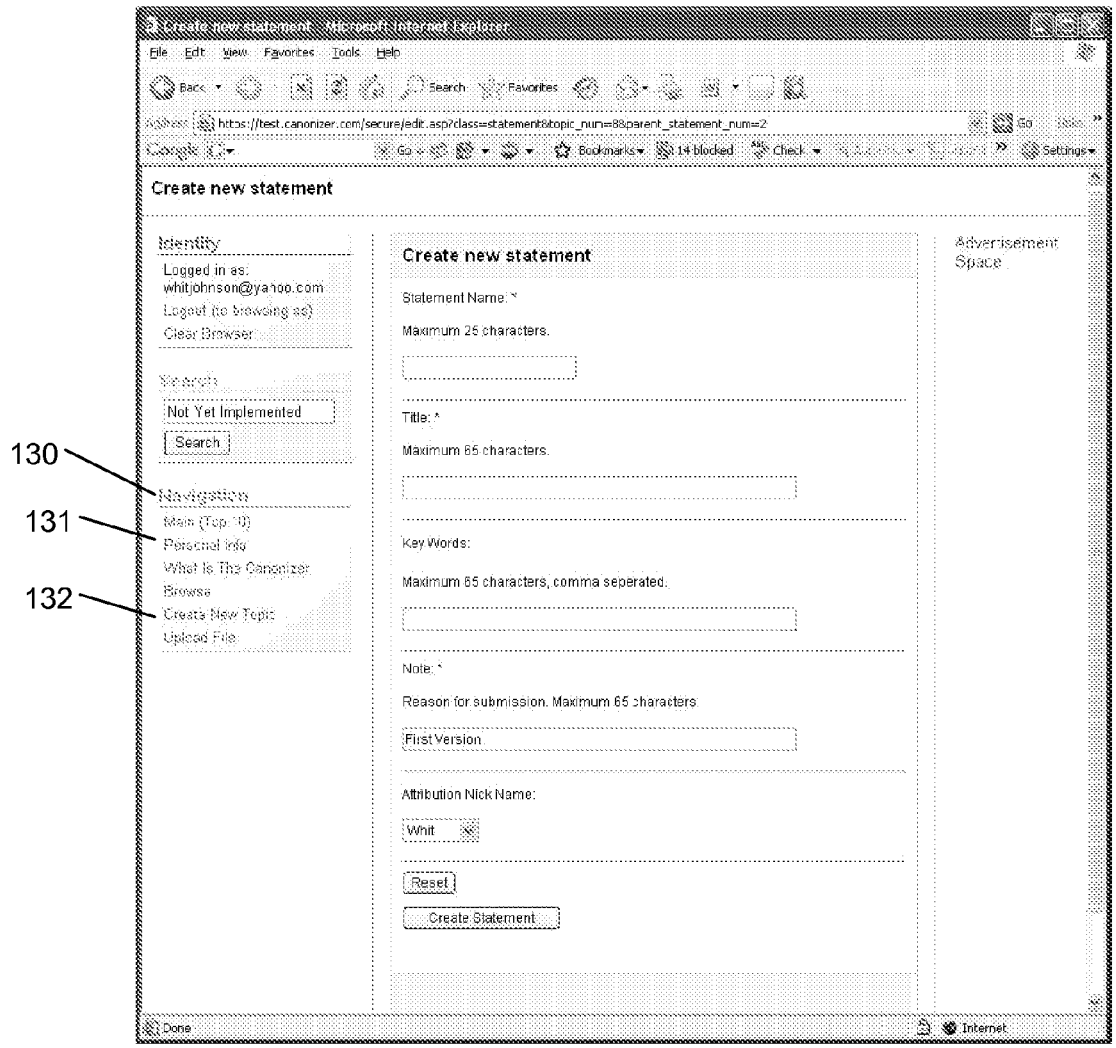
FIG. 8 is an illustration of a web page enabling a user to create or modify a new topic.

FIG. 8 illustrates a web page enabling a user to create a new topic according to one embodiment. The page has various fields for the user to provide information about the topic. The web page may be accessible from a link Create a New Topic 132, as illustrated in FIGS. 1 and 8. The fields on such web page may include, but are not limited to, a title, a particular namespace for adding a level of organization to storing the topics on file system on a server, an explanation of the reason or purpose in creating the new topic, and a nickname that may be used to identify and/or attribute the creator of the topic. In the present embodiment, the user enters and submits the information and the method creates a new topic. The new topic may then appear in the hierarchy of topics 110.

In the present embodiment, a user may create a topic, after which the user may be directed to one or more separate web pages to create a position statement for the topic and also support the topic. In another embodiment, the method may present the user, at the same time as creation of the topic, with a field to create the position statement. The user may be simultaneously presented with a link enabling the user to support the topic and corresponding position statement.

After creating a topic, the creator of the topic may be motivated to contact other users to support the topic so that the topic may appear higher in the hierarchy when ordered and displayed. Moreover, the creator may be motivated to encourage supporters to develop a position statement that represents the consensus point of view of a large number of supporters. In one embodiment, motivation may be provided by rewarding contributors. For example, a large number of users supporting a topic may entice companies to want to advertise in conjunction with the topic. In one embodiment, the contributors of content to popular position statements may share in advertising revenues generated by the content.

In another embodiment, a page similar to the one shown in FIG. 7 may be used to modify existing topics and the corresponding position statement.

Attributes of Supporters

Figure 9:
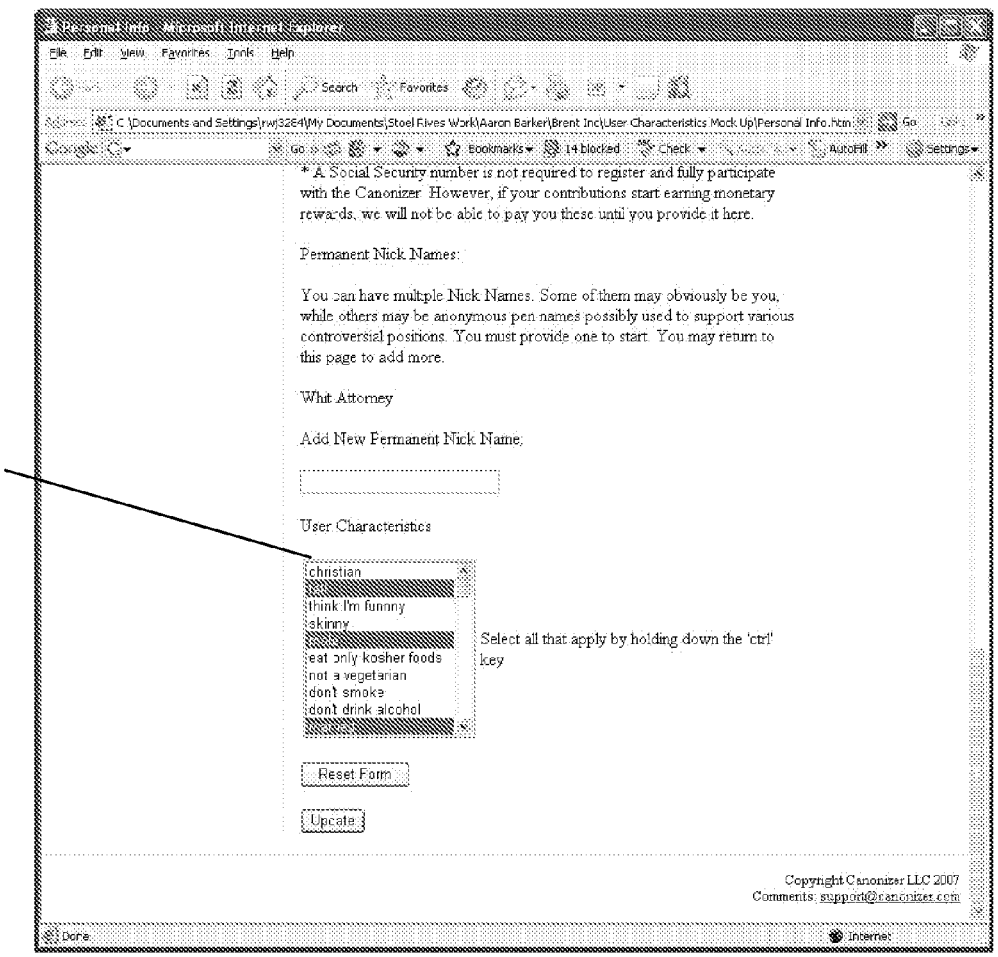
FIG. 9 is an illustration of a web page for enabling a user to select descriptive attributes.

FIG. 9 illustrates a web page for enabling a user to designate attributes about himself or herself according to one embodiment. In one embodiment, the method may display a link Personal Information 131 (depicted in FIGS. 1 and 9) that may access a web page enabling a user to register and designate personal information. Personal information may include name, address, telephone, email address, desired nicknames, and attributes describing the user. The personal information may be used as identifying information to create a virtual identity. Moreover, the contact information may be used to share with the user any revenues generated by content the user contributes.

In one embodiment, a nickname may be designated as anonymous. If a nickname is an anonymous nickname, no one may know more about who the user is and what other nicknames the user uses. If the nickname is not anonymous, the page showing the contributions and statements supported may include a link to the profile of the user. The profile may display all the personal information and attributes of the user that are not tagged as private. There may also be included information about any other public nicknames used by the user may use, and what topics the user has supported. A value determination algorithm may chose to ignore or lessen the weight of support by an anonymous nickname, but the algorithm will know all attributes, including private attributes, of the user associated with the nickname. Moreover, the embodiment may be configured to not count or show the support of an anonymous nickname if such might reveal the identity of the real user.

The attributes describing the user may be considered when the user supports one or more topics and then subsequent users order the hierarchy of topics 110 by selecting a set of attributes of supporters. In the embodiment of FIG. 9, the user may select attributes from a drop down list 910 on a web page. In other embodiments the user may be taken through a series of pages specifying attributes according to different categories or areas. The user may specify the criteria by highlighting, selection of a radio button, checking a checkbox, or any means of designating selection of an attribute. The user may be able to designate if an attribute selected is to be "private" or not. If an attribute is marked "private," it may not ever be publicly revealed about that user. The system may employ various methodologies to validate some claimed attributes, such as when someone claims to have a Ph.D. from Standford, an automatic validation system may be used to verify such. In other embodiments, a particular scientific journal or organization may have a designated set of "peers" which can be validated when claimed by a user or disallowed when the organization decides such.

In another embodiment, a user may be enabled to view sets of attributes created by other users, or in conjunction with defining a value determination algorithm, and view the attributes in each set. The user may have the ability to add or delete attributes from a list of attributes in each set. In still another embodiment, a user may be enabled to view a list of all the attributes in all the previously defined value determination algorithms and select attributes from the list. The list of attributes may further comprise a link providing more information or explanation about the attribute. The list of attributes may also be able to be sorted based on the attributes of the supporters having each attribute, similar to the ordering performed on the hierarchy of topics.

In another embodiment, all the attributes of a user may be self-selected, meaning that the user designates the attributes about himself or herself. In another embodiment, there may be system-defined attributes that are designated, tracked, and/or maintained external to the user. Still another embodiment may track a user's history, which may be considered as if an attribute. For example, if a person supports a "wrong" position statement representing an incorrect scientific theory for a long time and then joins another position statement representing a competing theory once more scientific evidence is available, the method may consider "they were wrong/right" information to determine the reliability or value of their current support.

In one embodiment, a user may be allowed one and only one identity to prevent a single person from biasing the level of support for a topic. A user may be prohibited from registering and maintaining multiple identities. The embodiment may enforce uniqueness of identity by setting system-defined attributes. For example, if it is discovered that a user is cheating by making multiple logins and effectively creating multiple identities, the user may incur an attribute identifying him or her as a "cheater," or otherwise identifying that he or she has committed a trust-destroying act. Information history about things deceivingly supported by multiple identities may be linked to the real owner. Later-created identities may be removed or locked out and associated information and history may be consolidated into the first created identity.

Certain value determination algorithms may require a quantifiable amount of reputation before they give them value. For example, one type of reputation that might not yet be valued is where someone that just signed up, with no established record of participation, having not yet earned and collected a pay check.

Some value determination algorithms may eventually "forgive and forget" about trust-destroying acts. For example, an attribute, "multiple identities within the past five years," would eventually 'forget' that a person was dishonest more than five years ago. Another example might be a religiously-oriented value determination algorithm that considers any support within the past two years for a statement that is anti-religious. Some user-selected sets of attributes or value determination algorithms may never forget, and may forever ignore the support of supporters having negative attributes when the set of attributes is selected to order the hierarchy of topics.

In another embodiment, the user may be allowed only one identity, but may be allowed to create multiple nicknames. Thus, a user may be able to have more than one identity but will never be able to use more than a single identity to support a topic.

Figure 10A:
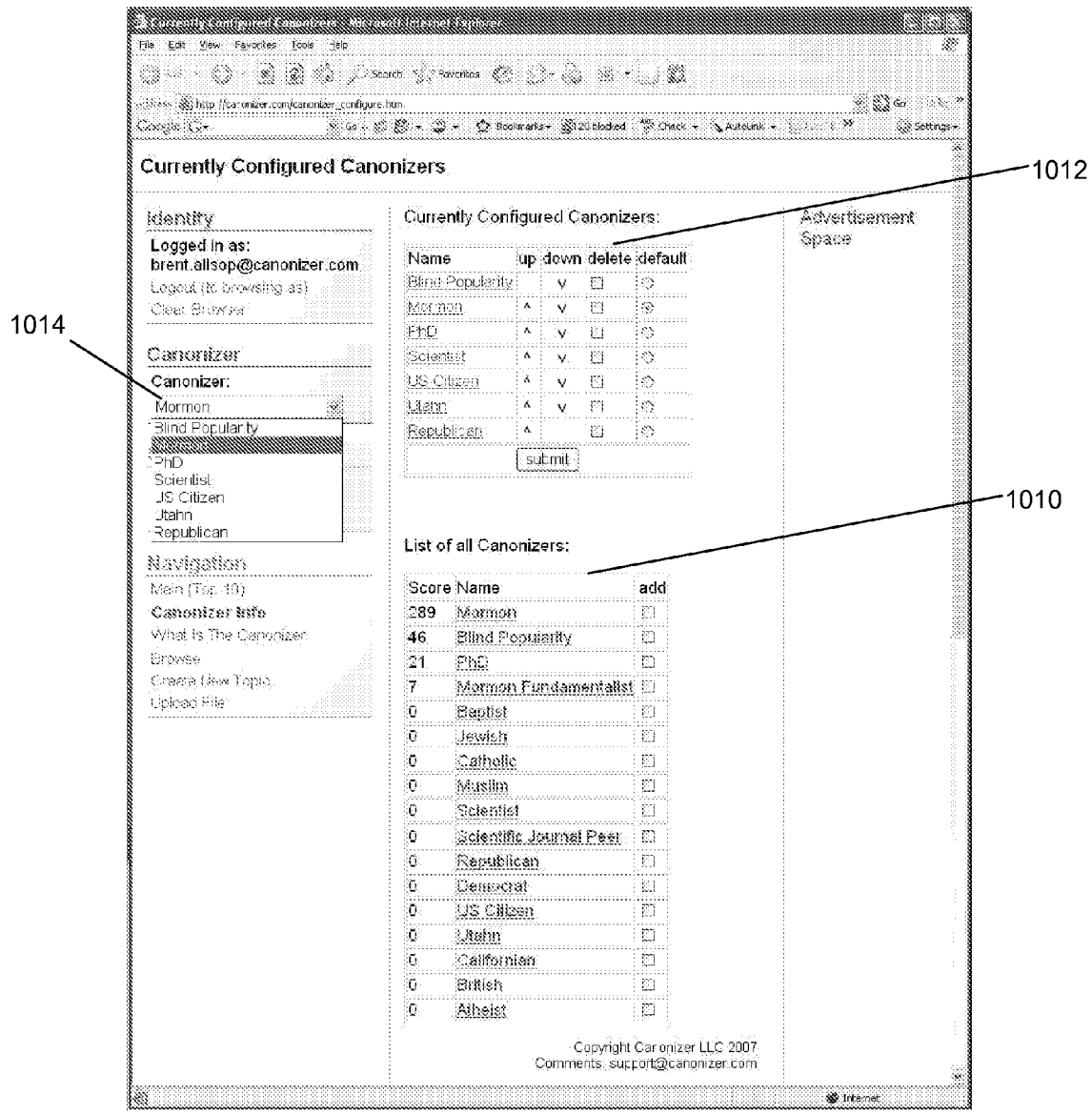
FIG. 10A is an illustration of a web page for enabling a user to define a value determination algorithm for ordering a hierarchy of topics by selecting a previously defined algorithm and either selecting from the set of attributes of supporters in that algorithm or modifying the previously defined algorithm.
Figure 10B:
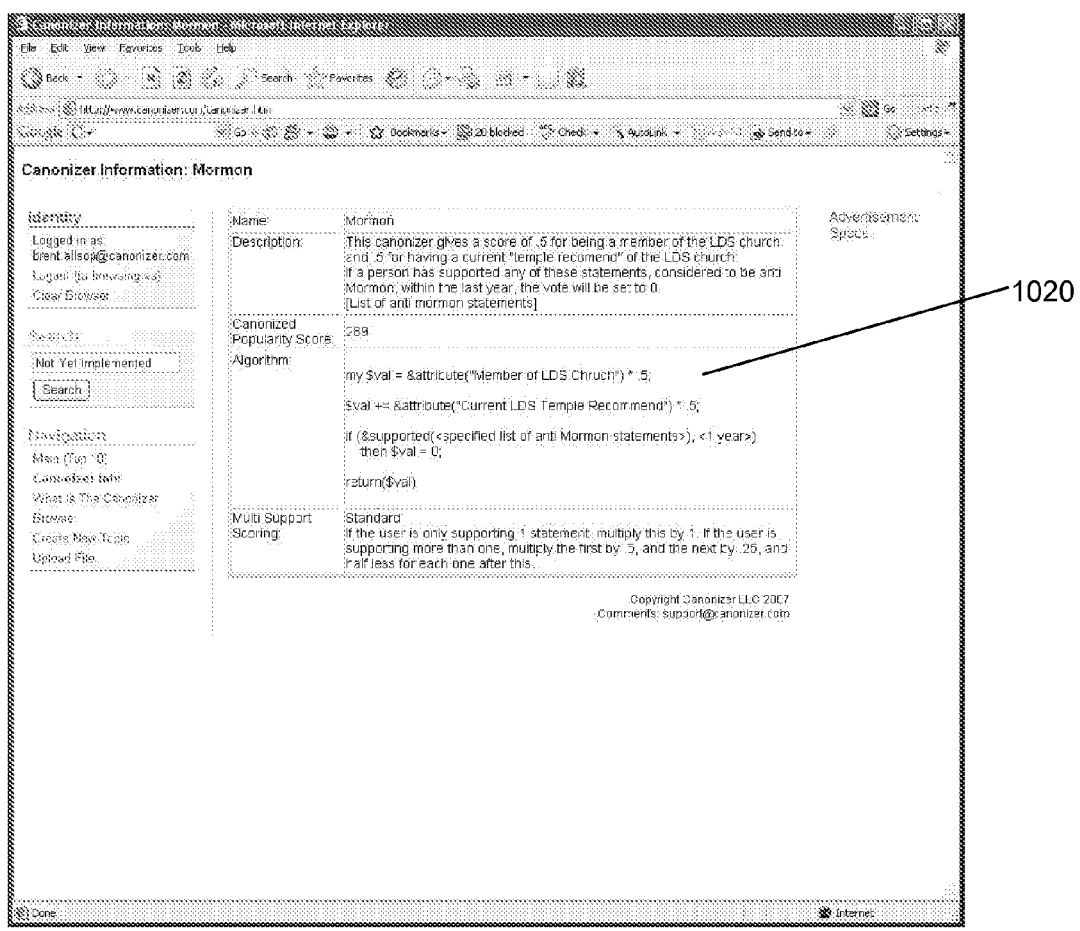
FIG. 10B is an illustration of a web page to which a user may be directed upon clicking a link to view more information about an algorithm.

FIG. 10A is an illustration of a web page enabling a user to configure a list of value determination algorithms. A similar page may be used to enable a user to define a value determination algorithm and to select a set of attributes about supporters by which to order the hierarchy of topics 110 A user may be interested in considering only topics that are important to supporters having certain attributes. In one embodiment, the hierarchy of topics may be ordered based solely on the set of attributes; users having the attributes in the set. In another embodiment, ordering of the hierarchy of topics may be accomplished by a value determination algorithm which may consider a set of user-selected attributes.

With reference to FIG. 10A, in one embodiment, the user is presented with a list List of All Algorithms 1010 of previously defined value determination algorithms. A user will always have a list List of Selectable Algorithms 1014 containing algorithms from which to choose. The page shown in FIG. 10A is one way a user may be enabled to manage this list. The algorithms listed in List of All Algorithms 1010 may have been previously defined by other users, by the present user, or by a system implementing the method. The user selects an algorithm from the list to add to a list of configured algorithms. A configured algorithm appears in the list Configured Algorithms 1012. The list Configured Algorithms 1012 may further populate the List of Selectable Algorithms 1014 from which the user may choose to order the hierarchy of topics 110.

Still referring to FIG. 10A, a user may be enabled to select a value determination algorithm and identify attributes of supporters that may be considered by the algorithm. In one embodiment, clicking on a label for an algorithm in one of the lists may present the user with a list of all the attributes considered by the algorithm. A registered user may then be enabled to add these attributes in defining a new value determination algorithm or set of attributes considered by an existing value determination algorithm. A user may be enabled to select more than one algorithm and view the attributes considered by all selected algorithms. A user may be enabled to view all attributes considered by all algorithms. In one embodiment, a user may be enabled to further select an attribute describing himself or herself, thus adding the attribute to the user's profile for consideration when a value determination algorithm orders the hierarchy of topics by determining the level of support from supporters having the attributes specified.

In addition to selecting the attributes for consideration in a value determination algorithm, a user may be enabled to assign a weight to each attribute. For example, the user may wish to consider the topics and position statements supported by women with a college education. The user may wish to consider slightly more heavily the topics supported by women having a graduate degree. Thus, the attribute of being female may have an assigned weight of 0.5 and the attribute of having college education weighted 0.1, the attribute of having a Bachelor's degree 0.1, the attribute of having a Master's degree 0.2, and the attribute of having a Doctorate degree 0.3.

In one embodiment, value determination algorithm may be labeled for easy identification. As mentioned in above, in FIG. 1, the value determination algorithm selected is labeled Blind Popularity 120. In one embodiment, the user may be enabled to view the selection and weighting of the attributes in a predefined set of attributes.

In another embodiment, clicking on a label for an algorithm in one of the lists may enable the user to view the implementation of an algorithm. FIG. 9B is an illustration of a web page to which a user may be directed upon clicking a link to view more information about an algorithm. In one portion of FIG. 9B, the code implementing the algorithm may be viewable. A value determination algorithm may be specified by a programming language, including but not limited to Perl, or some other scripting language. In one embodiment, users may email specifications of algorithms to be implemented by an administrator.

In one embodiment, a value determination algorithm may have a unique name and a text field that is the script or code implementing the algorithm to determine the level of support from a particular supporter of a topic and summing together all support from all supporters. A value determination algorithm may further include a "scoring type" to specify how a value is to be altered when a supporter supports more than one topic or camp.

An example of a scoring type may be to multiply by 1 the support of a supporter only supporting one topic in branch of the hierarchy, or if a supporter is supporting more than one topic in a branch, multiply the support by a fraction representing an equal distribution of the support and attribute that value to each supported topic. Another example of a scoring type may assign a multiplier of 0.5 to the topic first supported, and a smaller multiplier for each subsequently supported topic, the remaining multipliers being divided equally, or decreasing according to when the topic was supported or according to user-specified priority. A user may be enabled to designate a support priority for each topic supported. In one embodiment, all of the multipliers may sum to equal 1. Still another example may be that only the first supported statement is considered and, by default, multiplied by 1.

By way of example and not limitation, to define a value determination algorithm, such as Blind Popularity, that equates one supporter to one unit of support, the user might designate a single attribute that is common to all supporters for the algorithm to consider. For example, the attribute may be 'human being.' In ordering the hierarchy of topics 110, the embodiment may then consider whether a supporter of a topic is a human being. Every supporter is likely a human being, resulting in counting one unit of support per supporter for each topic. A simpler example would be simply considering every supporter as 'a supporter.' Still another example would be to simply always return 1 for every supporter.

Another example of a value determination algorithm, a Devout Catholic algorithm, may be implemented by considering multiple attributes. For example, the value determination algorithm may be implemented as "support value"=0.5*attribute ("baptized member of Catholic Church")+0.5*attribute ("attends Mass regularly"). The algorithm may further be implemented to specify if (supported([a specified list of anti-Christian statements], <2 years) then support value=0. Thus, if the supporter had supported any of the specified anti-Christian statements in the past 2 years, the support of that supporter would be ignored.

In another embodiment, clicking on a label for an algorithm in one of the lists may enable the user to view the implementation of an algorithm. FIG. 9B depicts a web page to which a user may be directed upon clicking a link to view more information about an algorithm. In one portion of FIG. 9B, the code 920 implementing the algorithm may be viewable. A value determination algorithm may be specified by a programming language, including but not limited to Perl, or some other scripting language. In one embodiment, users may email specifications of algorithms to an administrator to implement the algorithm. A user may also be enabled to define an algorithm by modifying an existing algorithm. The user may be enabled to designate modifications to the code 1020 of an existing algorithm. The embodiment may require the modifications be submitted to an administrator for approval before the new algorithm goes live.

In one embodiment, order a list of value determination algorithms according a value determination algorithm considering the attributes of users using the algorithm. In this manner, users may select a value determination algorithm to order the list of algorithms so as to find the algorithms preferred by other users having a set of one or more desired attributes. Selecting an algorithm from List of Selectable Algorithms 1014 may specify what algorithm to use to score and sort List of All Algorithms 1010. For each listed algorithm in List of All Algorithms 1010, the system may call the value determination algorithm specified and apply it to all users having the listed algorithm configured in their list Configured Algorithms 1012. The level of support generated by the specified algorithm for each supporter may then be summed for all supporters of the listed algorithm to determine the score of the listed algorithm. In other words, support of an algorithm may be indicated by having the algorithm in the list Configured Algorithms 1012.

In another embodiment, there may be a way to simply allow users to specify "support" for value determination algorithms. This support may then be used by a value determination algorithm to score and order the List of All Algorithms 1010 entries.

Ordering the value determination algorithms may facilitate a user in selecting a value determination algorithm to order the hierarchy of topics. Ordering may effectively rank, filter, prioritize, and organize the algorithms, empowering the user to best choose the algorithm that will order the hierarchy in a desired manner. Ordering according to supporter attributes may allow a user to rely on the experience of the supporters of the sets of attributes who have a set of one or more desired attributes.

Figure 11:
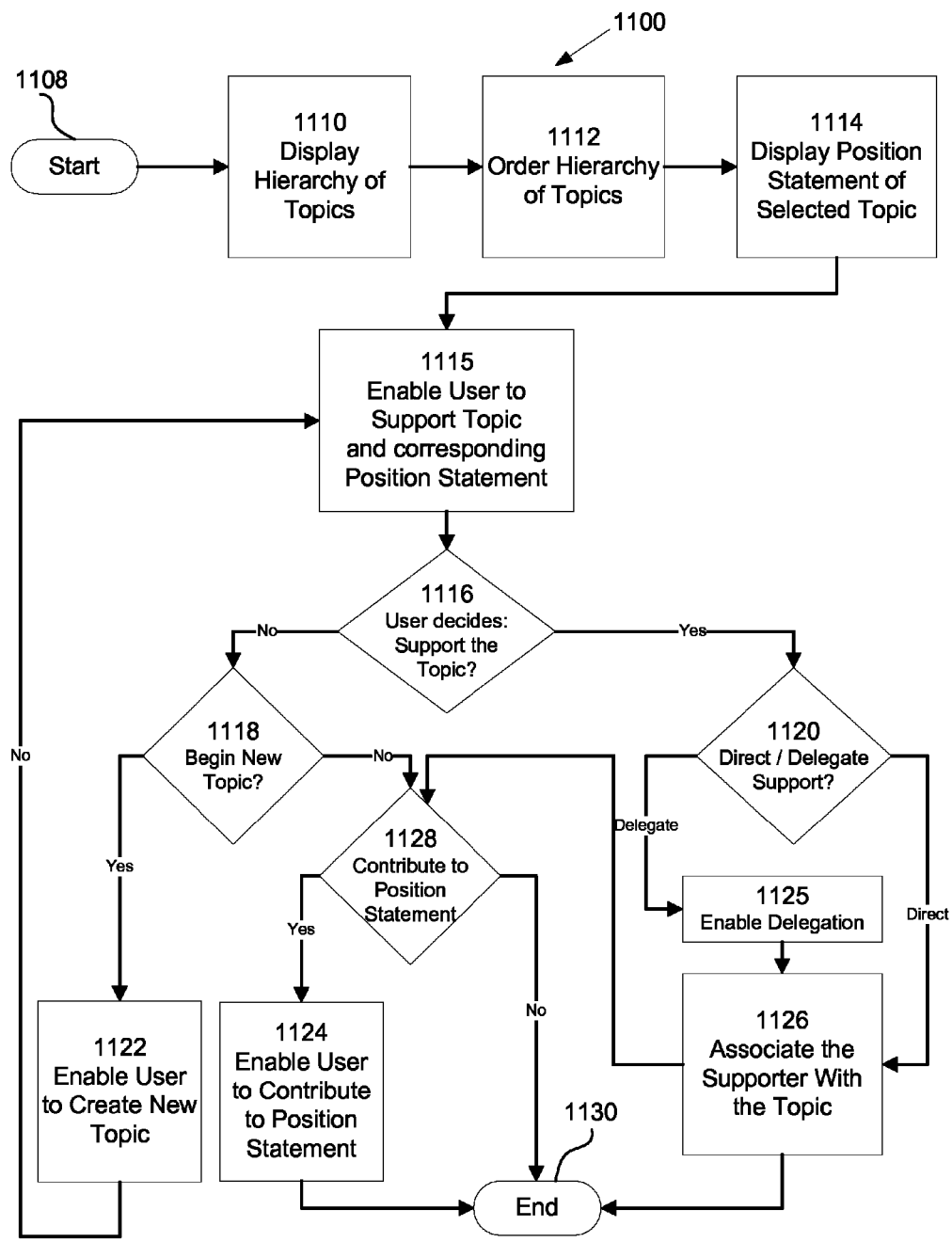
FIG. 11 is a flowchart of a method for conducting an online discussion.

FIG. 11 illustrates a flowchart of a method 1100 for conducting an online discussion according to one embodiment. In one embodiment, the method 1100 displays 1110 a hierarchy of topics. Initially, the hierarchy may be ordered according to a default setting. The embodiment may allow a user to select a value determination algorithm and then order 1112 the hierarchy accordingly. In other embodiments, the hierarchy may be ordered 1112 prior to being displayed 1110. Thus, the embodiment may allow the user to select the algorithm before the hierarchy is displayed 1110.

The user can select a particular topic from the hierarchy and display 1114 a position statement for that topic. The position statement may include statements representing a consensus point of view for one or more supporters of the topic. If there is no consensus point of view about the topic, or until one can be submitted, the position statement may not be required and may be empty. One or more varying points of view may appear as subtopics beneath the topic in the hierarchy. Each subtopic may also have a corresponding position statement representing a consensus point of view for the supporters of the subtopic.

When displaying a position statement, the embodiment may enable 1115 a user to become a supporter of the topic. The user decides 1116 whether or not to support the topic. The user may decide that he does not want to support the topic or does not agree with or want to support the corresponding position statement. The user may then decide 1118 whether to begin a new topic and, if so, may be enabled 1122 to create the new topic.

Still referring to FIG. 11, the user may not support the topic because he or she has a different point-of-view or different information to communicate about the topic and the different point of view or different information likely would not find acceptance among the supporters of the topic. The user may want to express the different point of view or different information, so the embodiment may enable 1122 the user to create a new topic. The topic may be created as a subtopic under the original topic in the hierarchy. In the alternative, the user may want to create an entirely new and unrelated topic at the top level of the hierarchy. When creating a new topic, the embodiment may also enable the user to create a position statement to express the user's differing point of view or different information. The embodiment may then enable 1115 the user to support the new topic.

If the user decides not to make a new topic, the user may decide 1128 whether to contribute to the content of the position statement for the topic. If the user wants to contribute, the user may be enabled 1124 to contribute. A user may contribute by submitting proposed changes to the currently live position statement of a topic. The proposed changes may be posted as a proposed version. In another embodiment, the changes may be submitted to the camp forum for review by members of the camp.

If the user does not want to contribute to the topic, the user may then end 1150 the method according to one embodiment, potentially returning to displaying 1110 the hierarchy of topics, ordering 1112 the topics, and/or displaying 1114 a position statement of a different topic.

Still referring to FIG. 11, if the user decides 1116 to support a topic, the embodiment may enable the user to decide and indicate 1120 whether the support is direct or delegated. In the present embodiment, indicating direct support may then enable the user to participate in reviewing proposed modifications to the position statement. In another embodiment, the user may even be required to participate. As an example of participating in reviewing content of the position statement, the user may be enabled 1124 to approve or comment on additions, deletions, and edits to the position statement as well as entirely new drafts of the position statement.

In another embodiment, only supporters may participate in contributing to the content of a position statement. After indicating direct support, the user may then be enabled to participate in providing the content of the position statement.

If the user decides 1120 to delegate support, the user may be enabled 1125 to select another supporter, a delegatee, to whom the user's support is delegated. The delegatee may then control any delegated support by either directly supporting a topic or by further delegating support to another delegatee. The delegated support follows the delegatee's support. In another embodiment, the delegated support may follow the delegatee even if the delegatee switches support to another topic, thereby switching camps.

Regardless of whether the user directly supports a topic or delegates support for a topic, the embodiment may associate 1126 the supporter with the topic. The embodiment may associate 1126 the supporter by considering the supporter and the supporter's attributes when ordering the hierarchy in the future according for another user's selected attributes.

Still referring to FIG. 11, after designating support a supporter may then decide 1128 whether to contribute to the content of the corresponding position statement.

Figure 12:
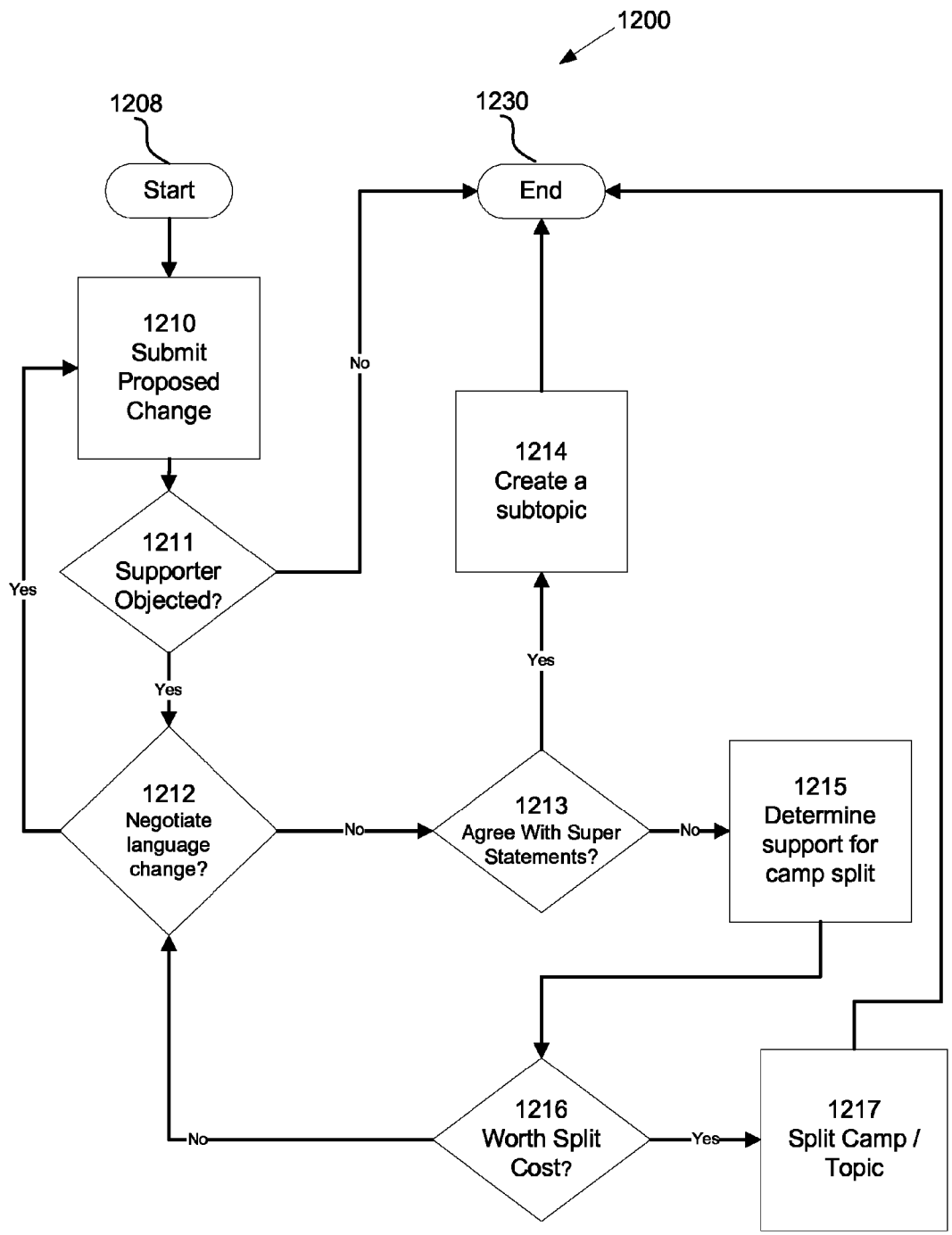
FIG. 12 is a flowchart of a method for enabling a user to make a change to a position statement or add additional information to the position statement.

FIG. 12 is a flowchart of a method 1200 for enabling a user to make a change to a position statement or add additional information to the position statement that, in the opinion of the user, should be added. The method has a start 1208 and an end 1230. In one embodiment, the user may be enabled to submit 1210 a proposed change. Submitting 1210 a proposed change may include sets of changes to the topic title, the position statement records, the parent camp, and the text of the position statement records. Any user may submit a change, even without supporting any topic.

A proposed change may undergo a period of review in which users may decide 1211 whether to object the proposed change. A proposed change may remain in proposed state during the review period. In one embodiment, anyone may object to a proposed change. In another embodiment, only registered users may object. In still another embodiment, only supporters of the topic may object to a proposed change. A supporter may have to have been a supporter for a minimum period to prevent users from temporarily supporting a topic just long enough to object. In still another embodiment, only current direct supporters can object during the review period.

If no one objects during the review period, unanimous agreement may be assumed, the proposed change may go live, and the method may end 1230.

In one embodiment, there may also be proactive mechanisms to immediately show preliminary support. Once all current supporters indicate unanimous support, the proposed change may instantly go live.

If a proposed change is objected to, then there may be opportunity to negotiate 1212 changes to the proposed changes. For example, some users may object to a proposed change due to simple typos or simple problems with the text. A simple negotiation 1012 to fix the simple mistake could take place, and then the proposed change could be submitted 1210 again for review. Often language can be found to satisfy all involved. In one embodiment, there may be both financial and influential incentives to resolve disagreements about the change at this level rather than adding more child (supporting) or sibling (competing) topics and corresponding position statements. The more concentrated the support in any one topic, the higher the support scores will be, resulting in more influence, more legitimacy, more readers, and more click-through advertising revenue, a portion of which may go to the contributors.

Still referring to FIG. 12, an objected-to proposed change may not be able to be successfully negotiated. The proponent of the change may then have a decision whether to create a new subtopic or split the camp by creating a competing sibling topic. If the proponent agrees 1213 with the currently active position statement and the position statements of all topics above the topic in the hierarchy, up to and including the associated top-level topic in the hierarchy, the proponent may choose to create 1214 a new subtopic and incorporate the changes into the corresponding position statement. By creating a new subtopic beneath the topic that the proposed changes were to modify, the proponent continues to agree (and also may potentially support) the topic, but is able to add the opinion or views expressed in the changes through the new topic. In one embodiment, creating a new subtopic may result in creation of a new camp. Upon creating 1214 the subtopic and corresponding position statement, the method may end 1230.

Still referring to FIG. 12, if the proponent of the changes cannot agree with the currently live position statement, the proponent may determine 1215 the level of support for the changes to decide whether to split the camp. Splitting the camp may involve gaining the support of supporters of the topic the proposed changes were to modify, and getting the supporters to shift their indication of support from the current topic to a new sibling topic incorporating the proposed changes.

In one embodiment, the only way to determine 1215 the level of support for proposed changes is to submit a post to the camp forum and seek responses to try to get an idea of how much support there is for the proposed changes. If only one supporter, or a very small percentage of supporters are objecting, then it may make sense to essentially make a new camp, essentially abandoning the few supporters that do not want to change support to the new camp. In another embodiment, there may be automated ways to poll supporters of the topic to be modified to get an idea of the level of support for a set of proposed changes.

Perhaps only half, or less than half, the supporters would be willing to change their support to a new competing topic, the proponent of the changes may be forced to decide 1216 whether it is worth splitting the camp. In this scenario, splitting the camp may result in less support for either of the topics and, thus, less priority when users are ordering topics based on level of support from users with a set of attributes.

If the proponent determines that splitting the camp is not worth the cost, the proponent may try another cycle of negotiation to try and effect the proposed changes.

If the proponent determines that splitting the camp is worth the cost, the proponent may split 1217 the camp by creating a new sibling topic. Splitting a camp may be possible at any level of the hierarchy, resulting in supporters of all subtopics being forced to choose between the two competing topics, including choosing whether which topic their particular camp should fall under in the hierarchy. Upon splitting the camp, the method may end 1230.

The present invention may be much broader than an "electronic forum" for discussion. There are billions of "lists" of topics, including testimonials, posts, comments, and reviews on everything all over the Internet. Review sites, reputation sites are similar to electronic forums for discussion in that the topic may be a product, a service, and individual, or virtually anything that could be discussed or commented on.

An embodiment of the present invention may be implemented such that any person, company, or entity needing to collect, organize, and filter information, especially information containing a lot of diversity and various points of view, may tap into the embodiment. The embodiment may implement the infrastructure, identity, and reputation back-end that these people, companies, and entities need. This back-end may comprise an interface that would allow all types of websites to programmatically utilize the back-end to allow their users to organize, sort, filter and order topics, statements, testimonials, reputation information, comments, reviews, and other types of feedback any way the users want. The embodiment may be implemented to centralize a reputation system such that all feedback everywhere could be gathered and ordered according to value determination algorithms.

It will be understood by those having skill in the art that many changes may be made to the details of the above-described embodiments without departing from the underlying principles of the invention.

What is claimed is:

1. A computer-implemented method for conducting online discussion comprising:
   receiving on a computing device a set of one or more attributes of supporters that are selected by a user;
   displaying on a display of a computing device a hierarchy of topics, the hierarchy of topics comprising a plurality of topics, including a top-level topic and one or more lower-level topics that are subtopics of the top-level topic, each of the one or more lower-level topics configured to be a top-level topic of another hierarchy of topics and to have one or more lower-level topics that are subtopics, each topic of the plurality of topics comprising a single unique position statement representing a consensus point of view of all supporters of the topic and all supporters of any subtopics beneath the topic, wherein each position statement comprises only content with which all of a plurality of supporters of the topic and all supporters of all subtopics below the topic in the hierarchy all agree, wherein each position statement is modified only through unanimous agreement of all supporters of the topic and subtopics of the topic to a proposed change to the position statement such that the content of each position statement is controlled by only agreement of all supporters of the topic, wherein a supporter's support of a topic is represented as a unit of support and the unit of support is added by the computing device to a total level of support for the topic and to a total level of support of all higher-level topics in the hierarchy, such that the total level of support for a given topic in the hierarchy is a sum of the units of support of both supporters of the given topic and of all supporters of all subtopics beneath the given topic, each of the one or more supporters having one or more attributes;
   at each level of the hierarchy, the computing device ordering the topics based on a level of support contributed by the supporters of the topic having attributes that match the received set of supporter attributes that are selected by the user;
   receiving on the computing device a selection of a topic from the ordered hierarchy; and
   in response to receiving the topic selection, displaying the corresponding position statement on the display of the computing device.

2. The method of claim 1, wherein supporters of a topic control changes to the topic and to all topics above the topic in the hierarchy of topics.

3. The method of claim 1, wherein the content of the position statement corresponding to each topic of the hierarchy of topics comprises propositions with which supporters of all subtopics below the topic in the hierarchy all agree.

4. The method of claim 1, wherein a plurality of supporters of each topic contribute to content of the position statement.

5. The method of claim 1, wherein at least one non-supporter of a topic contributes to content of the position statement by proposing a change to the content of the position statement.

6. The method of claim 1, further comprising receiving input from a user indicating that the user supports a topic, wherein supporting a topic indicates support for the corresponding position statement; and
including, automatically by the computer system, the user's support for all topics in the hierarchy above the supported topic.

7. The method of claim 6, further comprising:
receiving on the computing device input from a user indicating that the user supports a topic in the hierarchy of topics;
receiving from the user an input indicating whether the user's support is direct support or delegated support;
if an input is received indicating direct support, the computing device registering the user's support for the topic, by adding a unit of support to the total level of support for the topic, and imposing responsibility on the user to be involved in approval of proposed changes to the supported topic if an input is received indicating delegated support, receiving indication of a delegatee of the user, directing the user's delegated support to follow the support of the delegatee, and granting the delegatee control of the delegated support, wherein delegated support indicates agreement with the supported topic and corresponding position statement and delegates responsibility for the supported topic to the delegatee.

8. The method of claim 1, wherein displaying the position statement further comprises displaying a list of the supporters of each topic in a tree structure indicating whether a supporter's support is direct or delegated.

9. The method of claim 6 further comprising compiling into a single document all of the position statements the user supports.

10. The method of claim 1, wherein displaying the hierarchy of topics further comprises displaying adjacent each topic a support value indicator representing a level of support for that topic by supporters of that topic that match the received set of supporter attributes that are selected by the user, wherein the level of support is a sum of the units of support of the supporters of the topic and all subtopics of the topic having attributes that match the received set of supporter attributes.

11. The method of claim 1, wherein ordering the topics further comprises receiving from the user a weighting value for each of the supporter attributes that are selected by the user and weighting the unit of support of each of the one or more supporters according to the user-specified weighting value in the ordering of the hierarchy of topics.

12. The method of claim 1, wherein supporters of a topic control all changes to the topic and control all changes to all topics above the topic in the hierarchy of topics, and do not control changes to sibling topics or subtopics.

13. A computer-implemented method for filtering online discussion comprising:
displaying on a display of a computing device a list of one or more attributes of supporters of one or more topics in an online discussion;
receiving on a computing device a set of one or more attributes of supporters that are of interest to a user, the one or more attributes selected from the displayed list of attributes;
displaying on the display of the computing device a hierarchy of topics, the hierarchy of topics comprising a plurality of topics, including a top-level topic and one or more lower-level topics that are subtopics of the top-level topic, each of the one or more lower-level topics configured to be a top-level topic of another hierarchy of topics and to have one or more lower-level topics that are subtopics, each topic comprising a single unique position statement representing a consensus point of view of all supporters of the topic, the position statement comprising only content with which supporters of the topic and supporters of all subtopics below the topic in the hierarchy all agree, wherein each position statement is modified only through unanimous agreement of all supporters of the topic and subtopics of the topic to a proposed change to the position statement such that the content of each position statement is controlled by only agreement of all supporters of the topic;
at each level of the hierarchy, the computing device ordering the topics according to a level of support contributed by the supporters of each topic having one or more of the attributes from the received set of attributes of supporters that are of interest to the user.

14. The method of claim 13, wherein receiving the set of one or more attributes of the one or more supporters further comprises receiving a user-specified weight for each supporter attribute, the weight representing the level of importance of the supporter attribute for purposes of ordering the hierarchy of topics.

15. The method of claim 13, wherein displaying the hierarchy of topics further comprises displaying on the display of the computing device, adjacent each topic, a support value indicator conveying a level of support for that topic by supporters of each topic, wherein the level of support is a sum of the units of support of the supporters of the topic and all subtopics of the topic having attributes that match the received set of supporter attributes.

16. The method of claim 13, wherein a plurality of supporters of each topic contribute to content of the corresponding position statement.

17. The method of claim 13, wherein at least one non-supporter of a topic contributes to content of the position statement.

18. The method of claim 13 further comprising, in response to the-user to selecting a topic from the ordered hierarchy, displaying the corresponding position statement on the display of the computing device.

19. A computer-implemented method for conducting online discussion comprising:
displaying on a display of a computing device a hierarchy of topics, the hierarchy of topics comprising a plurality of topics, including a top-level topic and one or more lower-level topics that are subtopics of the top-level topic, each of the one or more lower-level topics is configured to be a top-level topic of another hierarchy of topics and to have one or more lower-level topics that are subtopics, each topic having a corresponding single, unique position statement representing a consensus point of view of all supporters of the topic and all supporters of any subtopics beneath the topic, the position statement comprising only content with which supporters of the topic and supporters of all subtopics below the topic in the hierarchy all agree, wherein each position statement is modified only through unanimous agreement of all supporters of the topic and subtopics of the topic to a proposed change to the position statement such that the content of each position statement is controlled by only agreement of all supporters of the topic;

receiving on the computing device input from a user indicating that the user supports a topic, wherein support for a topic indicates complete agreement with the corresponding position statement as well as support for all topics in the hierarchy above the supported topic and corresponding position statements, the computing device representing the support as a unit of support and adding the unit of support to a total level of support for the topic and to a total level of support of all higher-level topics in the hierarchy; and receiving from a user on the computing device input indicating whether the user's support is direct support or delegated support;

if an input indicating direct support is received, registering the user's support for the topic and thereafter notifying the user of any request to alter the supported topic;

if an input indicating delegated support is received, receiving indication of a delegatee of the user, directing the user's delegated support to follow the support of the delegatee, and giving the delegatee control of the delegated support, wherein delegated support indicates support for the topic and agreement with the position statement of the supported topic and delegates responsibility for the supported topic to the delegatee, and wherein delegated support also indicates delegated support for higher-level topics above the supported topic in the hierarchy of topics;

at each level of the hierarchy, the computing device ordering the topics based on a level of support contributed by the supporter of the topic having attributes that match a set of supporter attributes that are selected by the user.

20. The method of claim 19, wherein online discussion includes any forum for expressing opinion information such as comments, feedback, testimonials, posts, and reviews.

21. A computer-implemented method for conducting online discussion comprising:

receiving on a computing device a set of one or more attributes of supporters that are selected by reader;

displaying on a display of a computing device a hierarchy of topics, the hierarchy of topics comprising a plurality of topics, including a top-level topic and one or more lower-level topics that are subtopics of the top-level topic, wherein each of the one or more lower-level topics is configured to be a top-level topic of another hierarchy of topics and to have one or more lower-level topics that are subtopics, each topic corresponding to a position statement representing a consensus point of view of one or more supporters of the topic and all supporters of any subtopics beneath the topic, wherein the position statement of a topic is distinct from a position statement of subtopics of the topic, the position statement comprising only content with which all of a plurality of supporters of the topic and all supporters of all subtopics below the topic in the hierarchy all agree, wherein each position statement is modified only through unanimous agreement of all supporters of the topic and subtopics of the topic to a proposed change to the position statement such that the content of each position statement is controlled by only agreement of all supporters of the topic;

receiving on the computing device input from a reader indicating that the reader supports a first topic in the hierarchy of topics;

receiving on the computing device an input from the reader indicating whether the reader's support for the first topic is direct support or delegated support;

if an input is received indicating direct support, registering the reader's support for the topic and imposing responsibility for the position statement on the reader by thereafter notifying the reader of requested alterations to the position statement of the topic, wherein a supporter's support of a topic is implicitly included by the computing device as support for all higher-level topics in the hierarchy, such that a given topic in the hierarchy carries direct support of all supporters of the given topic and of all supporters of all subtopics beneath the given topic;

if an input is received indicating delegated support, receiving on the computing device indication of a delegatee of the reader and registering the reader's delegated support to match the delegatee's registered support, wherein delegated support indicates agreement with the corresponding position statement and support of all higher-level topics in the hierarchy, such that a given topic in the hierarchy carries indirect support of all supporters of the given topic and of all supporters of all subtopics beneath the given topic, and delegates responsibility for the position statement to the delegatee;

receiving a request from a modifier on a second computing device to modify the first topic, the request to modify comprising a proposed change to the position statement of the first topic;

notifying supporters of the first topic of the request to modify the first topic and requesting a response from the supporters;

receiving responses from the supporters for the first topic regarding the request to modify the first topic;

determining whether the request to modify the first topic is approved by all of the supporters of the first topic, including all supporters of all subtopics of the first topic;

upon determining that the request to modify the first topic is approved by the supporters of the first topic, modifying the first topic according to the request to modify.

22. The method of claim 21, further comprising:

presenting to the modifier on the second computing device an option to provide a new topic and corresponding position statement, upon the modifier's request to modify the first topic being rejected by the supporters of the first topic;

receiving on the second computing device a new topic and corresponding position statement from the modifier.

23. The method of claim 21, wherein displaying the hierarchy of topics further comprises ordering the topics at each level of the hierarchy based on attributes of the supporters of the topic compared to the set of one or more supporter attributes selected by the reader.

24. The method of claim 23, further comprising:

receiving on a second computing device a second set of one or more attributes of supporters that are selected by a second reader;

displaying on a display of a the second computing device the hierarchy of topics ordered at each level of the hierarchy based on attributes of the supporters of the topic compared to the second set of one or more supporter attributes selected by the second reader.

25. The method of claim 21, wherein notifying the reader of the request to modify the first topic and requesting a response comprises:
- sending the reader an electronic notification and requesting that the reader respond to reject the request to modify the first topic within a given time period;
- if a response is not received, assuming the request to modify the first topic is approved.

26. The method of claim 22, further comprising:
- receiving input from a first direct supporter withdrawing support for the first topic;
- receiving input from the first direct supporter indicating the direct supporter's support for the first topic is transferred to the new topic, wherein the new topic is a competing topic to the first topic;
- registering to the new topic the first direct supporter's support;
- registering to the new topic the delegated support of supporters who delegated to the first direct supporter their support for the first topic.

* * * * *